United States Patent
Asahi et al.

(10) Patent No.: US 7,663,705 B2
(45) Date of Patent: Feb. 16, 2010

(54) LIGHT PROPAGATION CHARACTERISTIC CONTROL APPARATUS, OPTICAL DISPLAY APPARATUS, LIGHT PROPAGATION CHARACTERISTIC CONTROL PROGRAM, OPTICAL DISPLAY APPARATUS CONTROL PROGRAM, LIGHT PROPAGATION CHARACTERISTIC CONTROL METHOD AND OPTICAL DISPLAY APPARATUS CONTROL METHOD

(75) Inventors: Tsunemori Asahi, Hotaka-machi (JP); Junichi Nakamura, Shiojiri (JP); Shoichi Uchiyama, Suwa-gun (JP); Takashi Nitta, Chino (JP)

(73) Assignee: Seiko Epson Corporation, Tokyo (JP)

( * ) Notice: Subject to any disclaimer, the term of this patent is extended or adjusted under 35 U.S.C. 154(b) by 843 days.

(21) Appl. No.: 11/013,336

(22) Filed: Dec. 17, 2004

(65) Prior Publication Data
US 2005/0157366 A1    Jul. 21, 2005

(30) Foreign Application Priority Data
Dec. 18, 2003 (JP) ............................. 2003-421451

(51) Int. Cl.
*G02F 1/00* (2006.01)
*G00G 5/00* (2006.01)

(52) U.S. Cl. .......................................... 348/758; 345/4
(58) Field of Classification Search .................... 345/4, 345/88, 89, 690–693; 359/238–324, 726; 348/758; 347/246; 385/1; 349/7, 5; 353/30, 353/31, 97
See application file for complete search history.

(56) References Cited

U.S. PATENT DOCUMENTS 4,231,640 A * 11/1980 Funada et al. ................. 349/82
5,103,328 A *  4/1992 Numao ........................ 349/74
5,223,959 A *  6/1993 Wu et al. ...................... 349/36

(Continued)

FOREIGN PATENT DOCUMENTS

JP    09-116840 A    5/1997

(Continued)

OTHER PUBLICATIONS

P. Debevec et al.; "Recovering High Dynamic Range Radiance Maps from Photographs," Proceedings of ACM SIGGRAPH97, pp. 367-378 (1997).

(Continued)

*Primary Examiner*—Kevin M. Nguyen
*Assistant Examiner*—Cory A Almeida
(74) *Attorney, Agent, or Firm*—Oliff & Berridge, PLC

(57) ABSTRACT

Exemplary embodiments of the present invention provide a light propagation characteristic control apparatus which extends the light-intensity dynamic range and the number of levels, and are suited for enhancing image quality and reducing the size and generation time of tables. Exemplary embodiments provide a projection display apparatus that tentatively decides a transmissivity T2 of each pixel of a color-modulation light valve depending upon HDR display data, and decides a transmissivity T1 of each pixel of an intensity-modulation light valve depending upon a tentatively decided transmissivity T2 and the HDR display data, and a control value of each pixel of the intensity-modulation light valve depending upon a decided transmissivity T1. Depending upon a decided transmissivity T1 and the HDR display data, transmissivity T2 is decided of each pixel of the color-modulation light valve. Depending upon a decided transmissivity T2, a control value is decided of each pixel of the color-modulation light valve.

13 Claims, 17 Drawing Sheets

U.S. PATENT DOCUMENTS

| | | | |
|---|---|---|---|
| 5,298,892 A * | 3/1994 | Shapiro et al. | 345/88 |
| 5,315,330 A * | 5/1994 | Hamada | 353/31 |
| 6,011,528 A * | 1/2000 | Inbar et al. | 345/77 |
| 6,369,879 B1 * | 4/2002 | Pedersen | 356/3.01 |
| 6,377,229 B1 * | 4/2002 | Sullivan | 345/6 |
| 6,795,053 B1 | 9/2004 | Funamoto et al. | |
| 7,027,016 B2 | 4/2006 | Sakashita | |
| 7,265,743 B2 | 9/2007 | Funamoto et al. | |
| 7,414,608 B2 | 8/2008 | Funamoto et al. | |
| 7,474,289 B2 | 1/2009 | Sakashita | |

FOREIGN PATENT DOCUMENTS

| | | |
|---|---|---|
| JP | A 2001-100689 | 4/2001 |
| JP | 2002-031846 A | 1/2002 |
| JP | 2002-055664 A | 2/2002 |
| JP | A 2002-99250 | 4/2002 |
| WO | WO 02/069030 A2 | 9/2002 |

OTHER PUBLICATIONS

F. Drago et al.; "Adaptive Logarithmic Mapping for Displaying High Contrast Scenes," Eurographics 2003, (2003).

Seetzen et al., "A High Dynamic Range Display Using Low and High Resolution Modulators," SID 03 Digest, pp. 1450-1453, 2003.

* cited by examiner

| Control value | 0 | 1 | 2 | 3 | 4 | 5 |
|---|---|---|---|---|---|---|
| Transmissivity | 0.003 | 0.006 | 0.009 | 0.012 | 0.017 | 0.025 |
| Control value | 6 | 7 | 8 | 9 | 10 | 11 |
| Transmissivity | 0.038 | 0.06 | 0.09 | 0.15 | 0.23 | 0.33 |
| Control value | 12 | 13 | 14 | 15 | | |
| Transmissivity | 0.44 | 0.52 | 0.57 | 0.6 | | |

420R

| Control value | 0 | 1 | 2 | 3 | 4 | 5 |
|---|---|---|---|---|---|---|
| Transmissivity | 0.004 | 0.007 | 0.010 | 0.013 | 0.018 | 0.026 |
| Control value | 6 | 7 | 8 | 9 | 10 | 11 |
| Transmissivity | 0.04 | 0.07 | 0.10 | 0.16 | 0.24 | 0.35 |
| Control value | 12 | 13 | 14 | 15 | | |
| Transmissivity | 0.45 | 0.52 | 0.57 | 0.6 | | |

$T_{15}=(T_{11} \times 25+T_{12} \times 5+T_{13} \times 5+T_{14} \times 1)/36$ (b)

(c)

$T_{19}=(T_{15}\times1+T_{16}\times4+T_{17}\times4+T_{18}\times16)/25$

LIGHT PROPAGATION CHARACTERISTIC CONTROL APPARATUS, OPTICAL DISPLAY APPARATUS, LIGHT PROPAGATION CHARACTERISTIC CONTROL PROGRAM, OPTICAL DISPLAY APPARATUS CONTROL PROGRAM, LIGHT PROPAGATION CHARACTERISTIC CONTROL METHOD AND OPTICAL DISPLAY APPARATUS CONTROL METHOD

BACKGROUND

Exemplary embodiments of the present invention relate to an apparatus, program and method to control the light propagation characteristic of an optical system to modulate the light from a light source through a plurality of light modulator elements. Exemplary embodiments further provide a light propagation characteristic control apparatus, optical display apparatus, light propagation characteristic control program, optical display apparatus control program, light propagation characteristic control method and optical display apparatus control method which extends the light-intensity dynamic range and the number of levels, and are suited to improve image quality and reduce the size and generation time of tables.

The enhancement of image quality is remarkable in the optical displays, such as LCDs (liquid crystal displays), ELs, plasma displays, CRTs (cathode ray tubes) and projectors, thus realizing the performance of resolution and color gamut nearly matched to human visual characteristics. However, as for light-intensity dynamic range, the reproduction scope lies nearly $1-10^2$ [nit] at most while the number of levels generally is 8 bits. Meanwhile, the human sense of sight has a light-intensity dynamic range of nearly $10^{-2}-10^4$ [nit] at one time of visual perception and an intensity discrimination ability of around 0.2 [nit]. This, if converted into the number of levels, is considered equivalent to 12 bits. When viewing a display image on the existing optical display through the visual characteristic like this, light-intensity dynamic range looks conspicuously narrow. In addition, display image is perceivably insufficient in reality and impressions due to the shortage of intensity levels in the shadow or highlight areas.

In computer graphics (hereinafter, abbreviated as CG) for use in movies, games, etc., the movement is toward pursuing a reality of expression by providing display data (hereinafter, HDR (high dynamic range) display data) with a light-intensity dynamic range and the number of levels closely approximated to the human sense of sight. However, because of insufficient performance of the optical display to display the same, there is a problem the power of expression the CG content possessed in nature could not be exhibited to a full extent.

Furthermore, the next-generation OS (operating system) is scheduled to adopt a 16-bit color space. This drastically increases the light-intensity dynamic range and intensity levels as compared to the current 8-bit color space. Therefore, there is a desire for realizing an optical display capable of making use of the 16-bit color space.

Of the optical displays, the projection displays, such as liquid-crystal projectors and DLP projectors, are capable of making a large-screen display. Thus, those are apparatuses effective reproducing reality and expressions in the display image. In this field, the following proposal has been made in order to address or solve the above discussed and/or other problems.

Related art document JP-A-2001-100689 discloses a technology of a high dynamic range of projection display that has a light source, a first light modulator element to modulate the intensity of light over the entire wavelength region, and a second light modulator element to modulate the light intensity in the wavelength regions as to the respective wavelength regions of RGB three primary colors in the wavelength regions of light. The light from the light source is modulated by the first light modulator element to form a desired light intensity distribution, whose optical image is focused to and color-modulated on a pixel plane of the second light modulator element thereby projecting the light secondary-modulated. The first light modulator element and the second light modulator element have respective pixels under separate control on the basis of the first and second control values decided from the HDR display data. The light modulator element has a pixel or segment structure where transmissivity is under independent control, using a transmissivity modulation element capable of controlling two-dimensional transmissivity distribution. The representative examples include a liquid-crystal light valve. Meanwhile, a reflectivity modulation element may be used in place of the transmissivity modulation element, the representative examples of which include a DMD.

Now consider a case of using a light modulator element having a transmissivity of 0.2% in dark display and of 60% in light display. The light modulator element singly is given a light-intensity dynamic range of 60/0.2=300. The related art document JP-A-2001-100689 discloses a projection display capable of realizing a light-intensity dynamic range of 300× 300=90000 because its light-intensity dynamic range corresponding to an arrangement of light modulator elements having a light-intensity dynamic range of 300 optically in series. Meanwhile, this concept is equivalently true for the number of levels, i.e. the 8-bit-leveled optical modulator elements optically arranged in series provide the number of levels exceeding 8 bits.

Related art document Helge Seetzen, Lome A. Whitehead, Greg Ward, "A High Dynamic Range Display Using Low and High Resolution Modulators", SID Symposium 2003, pp.1450-1453 (2003) (hereinafter Seetzen) discloses projection displays realizing high light-intensity dynamic range and a display as disclosed in related art document JP-A-2002-99250. Both related art documents use an LCD as a first light modulator element and a modulatable lighting, such as an LED or a fluorescent lamp, as a second light modulator element.

SUMMARY

HDR display data is image data capable of realizing a high light-intensity dynamic range not to be realized on the related art image format such as sRGB. This stores pixel values representative of intensity levels, on all the pixels of the image. Assuming that the pixel p of the HDR display data has an intensity level Rp, the pixel of the first light modulator element corresponding to the pixel p has a transmissivity T1 and the pixel of the second light modulator element corresponding to the pixel p has a transmissivity T2, the following equations (1) and (2) are held.

$$Rp = Tp \times Rs \quad (1)$$

$$Tp = T1 \times T2 \times G \quad (2)$$

where, in equations (1) and (2), Rs is an intensity level of the light source and G is a gain, each of which is a constant. Meanwhile, Tp is a light modulation ratio.

It can be seen, from equations (1) and (2) that there are an uncountable number of combinations of T1 and T2 as to the pixel p. However, T1 and T2 are not allowed to be arbitrarily decided. Because image quality will deteriorate by a certain manner of decision, there is a need to properly decide T1 and T2 in consideration of image quality.

The invention described in Seetzen is nothing more than a conceptional explanation on the fact that high light-intensity dynamic range is to be realized when using the two light modulator elements. It does not reach a disclosure on how the control value of each pixel of the first and second light modulator elements (i.e. T1 and T2) is decided depending upon HDR display data. Accordingly, there is a problem that image quality will be deteriorated by a certain manner of deciding T1 and T2.

Meanwhile, in the invention described in JP-A-2002-99250, intensity-level tables are held in the number corresponding to the number of levels of the backlight. Thus, there is a problem that, when the number of levels of the backlight are increased, there is an increase of the size of intensity level table and the time required to generate intensity level tables.

Therefore, exemplary embodiments of the present invention have been made to address the above discussed and/or other problems involved in the related arts. Exemplary embodiments provide a light propagation characteristic control apparatus, optical display apparatus, light propagation characteristic control program, optical display apparatus control program, light propagation characteristic control method and optical display apparatus control method which will realize the extension of light-intensity dynamic range and the number of levels and is suited to improve image quality and reduce the size and generation time of tables.

[Exemplary Embodiment 1]

In order to address or solve the above discussed and/or other problems, a light propagation characteristic control apparatus of exemplary embodiment 1 is an apparatus to be applied to an optical system to modulate light from a light source through a first light modulator element having a plurality of pixels capable of independently controlling light propagation characteristics and a second light modulator element having a plurality of pixels capable of independently controlling light propagation characteristics, the apparatus including:

a light propagation characteristic tentative deciding device to tentatively decide a light propagation characteristic of each pixel of the second light modulator element depending upon display data; and a first light propagation characteristic deciding device to decide a light propagation characteristic of each pixel of the first light modulator element depending upon a light propagation characteristic tentatively decided by the light propagation characteristic tentative deciding device and the display data;

the light propagation characteristic tentative deciding device being allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

With this structure, the light propagation characteristic tentative deciding device tentatively decides a light propagation characteristic of each pixel of the second light modulator element by use of a gamma characteristic expression depending upon display data while the first light propagation characteristic deciding device decides a light propagation characteristic of each pixel of the first light modulator element depending upon a tentatively decided light propagation characteristic and the display data.

Because the light from the light source is modulated through the first and second light modulator elements, it is possible to obtain an effect of realizing a comparatively high intensity dynamic range and the number of levels. Meanwhile, because the light propagation characteristic of each pixel of the second light modulator element is determined by the gamma characteristic expression, it is possible to obtain an effect of obtaining an image reduced in intensity and color irregularities and to reduce the possibility of deteriorated image quality as compared to the related art. Furthermore, it is possible to obtain an effect that the light propagation characteristic of each pixel of the second light modulator element can be determined comparatively rapidly because of comparatively simple operation of the gamma characteristic expression. Furthermore, it is not necessary to hold intensity tables in the number corresponding to the number of levels, there is little increase in the size and generation time of an intensity table as compared to the related art even where increasing the number of levels.

Here, light propagation characteristic refers to a characteristic having an effect upon light propagation, which includes light transmissivity, reflectivity, refractivity and other propagation characteristics. In the following, this is true for the optical display apparatus of exemplary embodiment 2, the light propagation characteristic control program of exemplary embodiment 11, the optical display apparatus control program of exemplary embodiment 12, the light propagation characteristic control method of exemplary embodiment 21 and the optical display apparatus control method of exemplary embodiment 22.

Meanwhile, the light source can use anything provided that it is a medium for generating light, e.g. a light source incorporated in an optical system such as a lamp or an exterior light source such as the sun or a room light. In the following, this is true for the light propagation characteristic control program of exemplary embodiment 11 and the light propagation characteristic control method of exemplary embodiment 21.

Meanwhile, the intensity of light may be given an index by physical radiance (W/(sr·m$^2$)) not taking into account human visual characteristic or by luminance (cd/m$^2$) taking into account human visual characteristic. In the following, this is true for the optical display apparatus of exemplary embodiment 2, the light propagation characteristic control program of exemplary embodiment 11, the optical display apparatus control program of exemplary embodiment 12, the light propagation characteristic control method of exemplary embodiment 21 and the optical display apparatus control method of exemplary embodiment 22.

[Exemplary Embodiment 2]

Meanwhile, in order to address or achieve the above object, an optical display apparatus of exemplary embodiment 2 is an apparatus having a light source, a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image, the apparatus includes:

a light propagation characteristic tentative deciding device to tentatively decide a light propagation characteristic of each pixel of the second light modulator element depending upon display data;

a first light propagation characteristic deciding device to decide a light propagation characteristic of each pixel of the first light modulator element depending upon the light propagation characteristic tentatively decided by the light propagation characteristic tentative deciding device and the display data;

a first control value deciding device to decide a control value of each pixel of the first light modulator element depending upon the light propagation characteristic decided by the first light propagation characteristic deciding device;

a second light propagation characteristic deciding device to decide a light propagation characteristic of each pixel of the second light modulator element depending upon the light propagation characteristic decided by the first light propagation characteristic deciding device and the display data; and a second control value deciding device to decide a control value of each pixel of the second light modulator element depending upon the light propagation characteristic decided by the second light propagation characteristic deciding device;

the light propagation characteristic tentative deciding device being allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

With this structure, the light propagation characteristic tentatively deciding device tentatively decides a light propagation characteristic of each pixel of the second light modulator element by use of the gamma characteristic expression depending upon display data. Then, the first light propagation characteristic deciding device decides a light propagation characteristic of each pixel of the first light modulator element depending upon the tentatively decided light propagation characteristic of the second light modulator element and display data while the first control-value deciding device decides a control value of each pixel of the first light modulator element depending upon the decided light propagation characteristic of the first light modulator element. Then, the second light propagation characteristic deciding device decides a light propagation characteristic of each pixel of the second light modulator element depending upon the decided light propagation characteristic of the first light modulator element and display data while the second control-value deciding device decides a control value of each pixel of the second light modulator element depending upon the decided light propagation characteristic of the second light modulator element.

Due to this, because the light from the light source is modulated through the first and second light modulator elements, it is possible to obtain an effect of realizing a comparatively high light-intensity dynamic range and the number of levels. Meanwhile, because the light propagation characteristic of each pixel of the second light modulator elements is determined by the gamma characteristic expression, it is possible to obtain an effect of obtaining an image reduced in luminance and color irregularities and to reduce the possibility of a deteriorated image quality as compared to the related art. Furthermore, it is possible to obtain an effect that the light propagation characteristic of each pixel of the second light modulator element can be determined comparatively rapidly because of comparatively simple operation of the gamma characteristic expression. Furthermore, because of no need to hold intensity level tables in the number corresponding to the number of levels, it is possible to obtain an effect that, there is little increase in the size and generation time of an intensity level table as compared to the related art even where the number of levels is increased.

Here, the second light propagation characteristic deciding device may be of any structure provided that the light propagation characteristic of each pixel of the second light modulator element is to be decided depending upon the light propagation characteristic decided by the first light propagation characteristic deciding device and display data. It may be made to decide a light propagation characteristic of each pixel of the second light modulator element depends upon an operation result or conversion result of an operation or conversion carried out depending upon a light propagation characteristic decided by the first light propagation characteristic deciding device without being limited to the light propagation characteristic decided by the first light propagation characteristic decided by the first light propagation characteristic deciding device. For example, because the control value decided by the first control-value deciding device is decided depending upon the light propagation characteristic decided by the first light propagation characteristic deciding device, the second light propagation characteristic deciding device is allowed to decide a light propagation characteristic of each pixel of the second light modulator element depending upon the control value decided by the first control-value deciding device and display data. In the following, this is true for the optical display apparatus control program of exemplary embodiment 12.

[Exemplary Embodiment 3]

Furthermore, an optical display apparatus of exemplary embodiment 3 is according to an optical display apparatus of exemplary embodiment 2. The light propagation characteristic tentative deciding device calculates the intensity level n with use of the following gamma characteristic expression by taking as Rp an intensity level of a pixel p in the display data, as Rmax a maximum value of intensity level in the display data, as n an intensity level of a pixel of second light modulator element corresponding to the pixel p, as m a coefficient in accordance with the number of levels of the second light modulator element and as γ a gamma coefficient, $$Rp = Rmax \times (n/m)^\gamma$$

and tentatively decides a light propagation characteristic of the pixel of second light modulator element corresponding to the pixel p based on the calculated intensity level n.

With this structure, the light propagation characteristic tentative deciding device calculates the intensity level n of the pixel of second light modulator element corresponding to the pixel p, by use of a gamma characteristic expression. Depending upon a calculated intensity level n, tentatively decided is a light propagation characteristic of the pixel of second light modulator element corresponding to the pixel p.

This can obtain an image reduced in luminance and color irregularities. Accordingly, it is possible to further reduce the possibility of a deteriorated image quality. Meanwhile, because a comparatively suitable intensity level n can be determined by one operation, there is no need for a feedback process. Thus, it is possible to obtain an effect of being suited for motion-picture processing.

[Exemplary Embodiment 4]

Furthermore, an optical display apparatus of exemplary embodiment 4 is according to an optical display apparatus of exemplary embodiment 3. The coefficient m is set at a value obtained by multiplying a multiplier greater than 1 to the number of levels of the second light modulator element.

With this structure, it is possible to precisely reproduce a dark intensity level of an image to be formed by the second light modulator element as compared to the case of setting the coefficient m at the number of levels of the second light modulator element, thus obtaining an effect to further reduce the possibility to deteriorate image quality.

[Exemplary Embodiment 5]

Furthermore, an optical display apparatus of exemplary embodiment 5 is according to any of optical display apparatuses of exemplary embodiments 3 and 4, the gamma coefficient γ being set at 4 or greater.

With this structure, it is possible to precisely reproduce a dark intensity level of an image to be formed by the second light modulator element as compared to the case of setting the gamma coefficient γ at less than 4.

[Exemplary Embodiment 6]

Furthermore, an optical display apparatus of exemplary embodiment 6 is according to any of optical display apparatuses of exemplary embodiments 3 and 4, the gamma coefficient γ being set at 0 or greater and ¼ or smaller.

With this structure, it is possible to precisely reproduce a light intensity level of an image to be formed by the second light modulator element as compared to the case of setting the gamma coefficient γ at a negative value or a value greater than ¼.

The present inventors have eagerly made studies and found that image deterioration depends upon how to determine T1 and T2, furthermore, under the influence of the following factor.

Where the first light modulator element and the second light modulator element respectively have different resolutions, there is a possibility that, concerning one pixel p1 of the first light modulator element, the pixel p1 overlaps, on an optical path, with a plurality of pixels of the second light modulator element. Conversely, concerning one pixel p2 of the second light modulator element, the pixel p2 overlaps, on an optical path, with a plurality of pixels of the first light modulator element. Here, in the case to calculate a transmissivity T1 for the pixel p1 of the first light modulator element, it can be considered that, if the transmissivities T2 of a plurality of overlapping pixels of the second light modulator element, a mean value, etc. of the transmissivities T2 is calculated so that the calculated mean value, etc. is regarded as a transmissivity T2 of the pixel of second light modulator element corresponding to the pixel p1 thereby calculating a transmissivity T1 by use of equations (1) and (2). However, the mean value, etc. is nothing more than being regarded as a transmissivity T2 of the second light modulator element, errors inevitably occur. Such errors occur regardless of the order of decision, i.e. in the case of deciding a transmissivity T1 of the first light modulator element first and in the case of deciding a transmissivity T2 of the second light modulator element first. For the one to decide a display resolution of the first and second light modulator elements, it is preferred to reduce the error to a possible small extent because of its significant visual influence.

For this reason, consideration is made as to how the magnitude of error changes with a change of decision order. At first, consider a case of deciding a transmissivity T2 of the second light modulator element first. The transmissivity T1 of the pixel p1 of the first light modulator element can be calculated by calculating a mean value, etc. of the transmissivities T2 of a plurality of overlapping pixels of the second light modulator element and then by the foregoing equations (1) and (2) on the basis of the calculated mean value, etc. and HDR display data. As a result, as considered from the pixel p1 of the first light modulator element, the transmissivity T1 has an error occurring relative to the transmissivities T2 of the plurality of overlapping pixels of the second light modulator element. The error is in a degree of an error caused in the statistic operation of a mean value, etc. Contrary to this, as considered from the pixel p2 of the second light modulator element, the transmissivity T2, even if calculating a mean value, etc. of the transmissivities T1 of the plurality of overlapping pixels of the first light modulator element, possibly has such a great error relative to the mean value, etc. as not to satisfy the foregoing equations (1) and (2). This can be considered responsible for the following, i.e. even when defining a relationship with a plurality of overlapping pixels of the second light modulator element with reference to the pixel p1 (relationship satisfying equations (1) and (2)), the relationship in reverse is not necessarily held true. Accordingly, error is possibly greater in the transmissivity T2 of the second light modulation element.

Accordingly, when deciding the transmissivity T1 of the first light modulator element first, error is possibly greater in the transmissivity T1 of the first light modulator element.

From the above, a conclusion is obtained that the influence of error can be reduced if deciding later a transmissivity of the first and second light modulator elements decisive of the resolution of display, from the viewpoint of enhancing image quality.

[Exemplary Embodiment 7]

Furthermore, an optical display apparatus of exemplary embodiment 7 is according to any of optical display apparatuses of exemplary embodiments 2 to 6, the second light modulator element being a light modulator element decisive of a resolution of display.

With this structure, because decided later is a light propagation characteristic of the second light modulator elements decisive of the resolution of display, it is possible to obtain an effect of suppressing the influence of error and further reducing the possibility of deteriorated image quality.

[Exemplary Embodiment 8]

Furthermore, an optical display apparatus of exemplary embodiment 8 is according to any of optical display apparatuses of exemplary embodiments 2 to 7. One of the first and second light modulator elements is a particular-wavelength-regioned intensity modulator element to modulate an intensity of light in a particular wavelength region as to a plurality of different particular wavelength regions of a wavelength region of light. The other of the first and second light modulator elements being the entire-wavelength-regioned modulator element to modulate an intensity of light over the entire wavelength region.

With this structure, one of the first and second light modulator elements modulates an intensity of light at the particular wavelength region while the other of the first and second light modulator elements modulates an intensity of light over the entire wavelength region of light.

Due to this, because it is satisfactory to merely add one light modulator element to the related art optical display apparatus, it is possible to obtain an effect that the optical display apparatus of exemplary embodiments of the invention can be structured comparatively easily.

Here, the particular-wavelength-regioned intensity modulator element may be in any structure provided that to modulate an intensity of light in a particular wavelength region as to a plurality of different particular wavelength regions of a wavelength region of light, i.e. may be structured by a single particular-wavelength-regioned intensity modulator element or by a plurality of particular-wavelength-regioned intensity modulator elements. In the former case, the representative example includes a structure of a liquid-crystal light valve provided with an RGB-three-primary-colored color filter. Meanwhile, in the latter case, for each particular wavelength region, it is satisfactory to provide a particular-wavelength-regioned intensity modulator element to modulate an intensity of light over the particular wavelength region. The representative example includes a structure including a liquid-crystal light valve based on RGB three primary colors. In the following, this is true for the optical display apparatus of exemplary embodiment 9, the optical display apparatus control program of exemplary embodiments 18 and 19, and the optical display apparatus control method of exemplary embodiments 28 and 29.

Meanwhile, the particular wavelength region can be arbitrarily set without limited to the setting based on RGB three primary colors. Nevertheless, the setting based on RGB three primary colors makes it possible to utilize the existing liquid-crystal light valve without change, which is advantageous in terms of cost. In the following, this is true for the optical display apparatus of exemplary embodiment 9, the optical display apparatus control program of exemplary embodiments 18 and 19, and the optical display apparatus control method of exemplary embodiments 28 and 29.

[Exemplary Embodiment 9]

Furthermore, an optical display apparatus of exemplary embodiment 9 is according to any of optical display apparatuses of exemplary embodiments 2 to 7. The first and second light modulator elements are particular-wavelength-regioned intensity modulator elements to modulate an intensity of light in a particular wavelength region as to a plurality of different particular wavelength regions of a wavelength region of light.

With this structure, the first and second light modulator elements modulate an intensity of light at the particular wavelength region by two stages.

Due to this, because the intensity of light at a particular wavelength region of light can be modulated independently in two stages, it is possible to obtain an effect of further reducing the possibility of deteriorated image quality.

[Exemplary Embodiment 10]

Furthermore, an optical display apparatus according to any of optical display apparatuses of exemplary embodiments 2 to 9, the second light modulator element having a higher resolution than the first light modulator element.

With this structure, because the second light modulator element provides the greater visual influence, the effect of error can be suppressed furthermore. Hence, it is possible to obtain an effect of further reducing the possibility of deteriorated image quality.

[Exemplary Embodiment 11]

Meanwhile, in order to address or achieve the above object, a light propagation characteristic control program of exemplary embodiment 11 is a program to be applied to an optical system to modulate light from a light source through a first light modulator element having a plurality of pixels capable of independently controlling light propagation characteristics and a second light modulator element having a plurality of pixels capable of independently controlling light propagation characteristics. The program causes a computer to execute a process to be realized as a light propagation characteristic tentative deciding device to tentatively decide a light propagation characteristic of each pixel of the second light modulator element depending upon display data; and a first light propagation characteristic deciding device to decide a light propagation characteristic of each pixel of the first light modulator element depending a light propagation characteristic tentatively decided by the light propagation characteristic tentative deciding device and the display data.

The light propagation characteristic tentative deciding device is allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

With this structure, in the case the program is read out by the computer and then the computer executes the process according to the program read out, it is possible to obtain the operation and effect equivalent to that of the light propagation characteristic control apparatus of exemplary embodiment 1.

[Exemplary Embodiment 12]

Meanwhile, in order to address or achieve the above object, a light display apparatus control program of exemplary embodiment 12 is a program to control an optical display apparatus having a light source, a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image.

The program causes a computer to execute a process to be realized as a light propagation characteristic tentative deciding device to tentatively decide a light propagation characteristic of each pixel of the second light modulator element depending upon display data;

a first light propagation characteristic deciding device to decide a light propagation characteristic of each pixel of the first light modulator element depending upon the light propagation characteristic tentatively decided by the light propagation characteristic tentative deciding device and the display data;

a first control value deciding device to decide a control value of each pixel of the first light modulator element depending upon the light propagation characteristic decided by the first light propagation characteristic deciding device;

a second light propagation characteristic deciding device to decide a light propagation characteristic of each pixel of the second light modulator element depending upon the light propagation characteristic decided by the first light propagation characteristic deciding device and the display data; and a second control value deciding device to decide a control value of each pixel of the second light modulator element depending upon the light propagation characteristic decided by the second light propagation characteristic deciding device.

The light propagation characteristic tentative deciding device is allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

With this structure, in the case the program is read out by the computer and then the computer executes the process according to the program read out, it is possible to obtain the operation and effect equivalent to that of the optical display apparatus of exemplary embodiment 2.

[Exemplary Embodiment 13]

Furthermore, an optical display apparatus control program of exemplary embodiment 13 is according to an optical display apparatus control program of exemplary embodiment 12. The light propagation characteristic tentative deciding device calculates the intensity level n with use of the following gamma characteristic expression by taking as Rp an intensity level of a pixel p in the display data, as Rmax a maximum value of intensity level in the display data, as n an intensity level of a pixel of second light modulator element corresponding to the pixel p, as m a coefficient in accordance with the number of levels of the second light modulator element and as γ a gamma coefficient, $$Rp = Rmax \times (n/m)^\gamma$$

and tentatively decides a light propagation characteristic of the pixel of second light modulator element corresponding to the pixel p based on the calculated intensity level n.

With this structure, in the case the program is read out by the computer and then the computer executes the process according to the program read out, it is possible to obtain the operation and effect equivalent to that of the optical display apparatus of exemplary embodiment 3.

[Exemplary Embodiment 14]

Furthermore, an optical display apparatus control program of exemplary embodiment 14 is according to an optical display apparatus control program of exemplary embodiment 13. The coefficient m is set at a value obtained by multiplying a multiplier greater than 1 to the number of levels of the second light modulator element.

With this structure, in the case the program is read out by the computer and then the computer executes the process according to the program read out, it is possible to obtain the operation and effect equivalent to that of the optical display apparatus of exemplary embodiment 4.

[Exemplary Embodiment 15]

Furthermore, an optical display apparatus control program of exemplary embodiment 15 is according to any of optical display apparatus control programs of exemplary embodiments 13 and 14, the gamma coefficient γ being set at 4 or greater.

With this structure, in the case the program is read out by the computer and then the computer executes the process according to the program read out, it is possible to obtain the operation and effect equivalent to that of the optical display apparatus of exemplary embodiment 5.

[Exemplary Embodiment 16]

Furthermore, an optical display apparatus control program of exemplary embodiment 16 is according to any of optical display apparatus control programs of exemplary embodiments 13 and 14, the gamma coefficient γ being set at 0 or greater and ¼ or smaller.

With this structure, in the case the program is read out by the computer and then the computer executes the process according to the program read out, it is possible to obtain the operation and effect equivalent to that of the optical display apparatus of exemplary embodiment 6.

[Exemplary Embodiment 17]

Furthermore, an optical display apparatus control program of exemplary embodiment 17 is according to any of optical display apparatus control programs of exemplary embodiments 12 to 16, the second light modulator element being a light modulator element decisive of a resolution of display.

With this structure, in the case the program is read out by the computer and then the computer executes the process according to the program read out, it is possible to obtain the operation and effect equivalent to that of the optical display apparatus of exemplary embodiment 7.

[Exemplary Embodiment 18]

Furthermore, an optical display apparatus control program of exemplary embodiment 18 is according to any of optical display apparatus control programs of exemplary embodiments 12 to 17. One of the first and second light modulator elements is a particular-wavelength-regioned intensity modulator element to modulate an intensity of light in a particular wavelength region as to a plurality of different particular wavelength regions of a wavelength region of light. The other of the first and second light modulator elements are an entire-wavelength-regioned modulator element to modulate an intensity of light over the entire wavelength region.

With this structure, in the case the program is read out by the computer and then the computer executes the process according to the program read out, it is possible to obtain the operation and effect equivalent to that of the optical display apparatus of exemplary embodiment 8.

[Exemplary Embodiment 19]

Furthermore, an optical display apparatus control program of exemplary embodiment 19 is according to any of optical display apparatus control programs of exemplary embodiments 12 to 17, the first and second light modulator elements are particular-wavelength-regioned intensity modulator elements to modulate an intensity of light in a particular wavelength region as to a plurality of different particular wavelength regions of a wavelength region of light.

With this structure, in the case the program is read out by the computer and then the computer executes the process according to the program read out, it is possible to obtain the operation and effect equivalent to that of the optical display apparatus of exemplary embodiment 9.

[Exemplary Embodiment 20]

Furthermore, an optical display apparatus control program of exemplary embodiment 20 is according to any of optical display apparatus control programs of exemplary embodiments 12 to 19, the second light modulator element having a higher resolution than the first light modulator element.

With this structure, in the case the program is read out by the computer and then the computer executes the process according to the program read out, it is possible to obtain the operation and effect equivalent to that of the optical display apparatus of exemplary embodiment 10.

[Exemplary Embodiment 21]

Meanwhile, in order to address or achieve the above object, a light propagation characteristic control method of exemplary embodiment 21 is a method to be applied to an optical system to modulate light from a light source through a first light modulator element having a plurality of pixels capable of independently controlling light propagation characteristics and a second light modulator element having a plurality of pixels capable of independently controlling light propagation characteristics. The method includes:

tentatively deciding a light propagation characteristic of each pixel of the second light modulator element depending upon display data; and deciding a light propagation characteristic of each pixel of the first light modulator element depending upon a light propagation characteristic tentatively decided by the light propagation characteristic tentative deciding and the display data;

the light propagation characteristic tentative deciding is allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

This provides the effect equivalent to that of the light propagation characteristic control apparatus of exemplary embodiment 1.

[Exemplary Embodiment 22]

Meanwhile, in order to address or achieve the above object, an optical display apparatus control method of exemplary embodiment 22 is a method to control an optical display apparatus having a light source, a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image. The method includes:

tentatively deciding a light propagation characteristic of each pixel of the second light modulator element depending upon display data;

deciding a light propagation characteristic of each pixel of the first light modulator element depending upon the light propagation characteristic tentatively decided by the light propagation characteristic tentative deciding and the display data;

deciding a control value of each pixel of the first light modulator element depending upon the light propagation characteristic decided by the first light propagation characteristic deciding;

deciding a light propagation characteristic of each pixel of the second light modulator element depending upon the light propagation characteristic decided by the first light propagation characteristic deciding and display data; and deciding a control value of each pixel of the second light modulator element depending upon the light propagation characteristic decided by the second light propagation characteristic deciding;

The light propagation characteristic tentative deciding is allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient.

This provides the effect equivalent to that of the optical display apparatus of exemplary embodiment 2.

Here, the second light propagation characteristic deciding may be of any structure provided that the light propagation characteristic of each pixel of the second light modulator element is to be decided depending upon the light propagation characteristic decided by the first light propagation characteristic deciding and display data. It may be made to decide a light propagation characteristic of each pixel of the second light modulator element depending upon an operation result or conversion result of an operation or conversion carried out depending upon a light propagation characteristic decided by the first light propagation characteristic deciding without limited to the light propagation characteristic decided by the first light propagation characteristic deciding. For example, because the control value decided by the first control-value deciding is decided depending upon the light propagation characteristic decided by the first light propagation characteristic deciding, the second light propagation characteristic deciding is allowed to decide a light propagation characteristic of each pixel of the second light modulator element depending upon the control value decided by the first control-value deciding and display data.

[Exemplary Embodiment 23]

Furthermore, an optical display apparatus control method of exemplary embodiment 23 is according to the optical display apparatus control method of exemplary embodiment 22. The light propagation characteristic tentative deciding calculates the intensity level n with use of the following gamma characteristic expression by taking as Rp an intensity level of a pixel p in the display data, as Rmax a maximum value of intensity level in the display data, as n an intensity level of a pixel of second light modulator element corresponding to the pixel p, as m a coefficient in accordance with the number of levels of the second light modulator element and as γ a gamma coefficient, $$Rp = Rmax \times (n/m)^\gamma$$

and tentatively decides a light propagation characteristic of the pixel of second light modulator element corresponding to the pixel p based on the calculated intensity level n.

This provides an effect equivalent to that of the optical display apparatus of exemplary embodiment 3.

[Exemplary Embodiment 24]

Furthermore, an optical display apparatus control method of exemplary embodiment 24 is according to the optical display apparatus control method of exemplary embodiment 23, the coefficient m being set at a value obtained by multiplying a multiplier greater than 1 to the number of levels of the second light modulator element.

This provides an effect equivalent to that of the optical display apparatus of exemplary embodiment 4.

[Exemplary Embodiment 25]

Furthermore, an optical display apparatus control method of exemplary embodiment 25 is according to the optical display apparatus control method of exemplary embodiments 23 or 24, wherein the gamma coefficient γ is set at 4 or greater.

This provides an effect equivalent to that of the optical display apparatus of exemplary embodiment 5.

[Exemplary Embodiment 26]

Furthermore, an optical display apparatus control method of exemplary embodiment 26 is according to the optical display apparatus control method of exemplary embodiments 23 or 24, wherein the gamma coefficient γ is set at 0 or greater and ¼ or smaller.

This provides an effect equivalent to that of the optical display apparatus of exemplary embodiment 6.

[Exemplary Embodiment 27]

Furthermore, an optical display apparatus control method of exemplary embodiment 27 is according to any of the optical display apparatus control methods of exemplary embodiments 22 to 26, the second light modulator element being a light modulator element decisive of a resolution of display.

This provides an effect equivalent to that of the optical display apparatus of exemplary embodiment 7.

[Exemplary Embodiment 28]

Furthermore, an optical display apparatus control method of exemplary embodiment 28 is according to any of the optical display apparatus control methods of exemplary embodiments 22 to 27, one of the first and second light modulator elements being a particular-wavelength-regioned intensity modulator element to modulate an intensity of light in a particular wavelength region as to a plurality of different particular wavelength regions of a wavelength region of light. The other of the first and second light modulator elements being an entire-wavelength-regioned modulator element to modulate an intensity of light over the entire wavelength region.

This provides an effect equivalent to that of the optical display apparatus of exemplary embodiment 8.

[Exemplary Embodiment 29]

Furthermore, an optical display apparatus control method of exemplary embodiment 29 is according to any of the optical display apparatus control methods of exemplary embodiments 22 to 27, the first and second light modulator elements being particular-wavelength-regioned intensity modulator elements to modulate an intensity of light in a particular wavelength region as to a plurality of different particular wavelength regions of a wavelength region of light.

This provides an effect equivalent to that of the optical display apparatus of exemplary embodiment 9.

[Exemplary Embodiment 30]

Furthermore, an optical display apparatus control method of exemplary embodiment 30 is according to any of the optical display apparatus control methods of exemplary embodiments 22 to 29, the second light modulator element having a higher resolution than the first light modulator element.

This provides an effect equivalent to that of the optical display apparatus of exemplary embodiment 10.

BRIEF DESCRIPTION OF THE DRAWINGS

FIG. 4 is a figure showing a data structure of a control-value library table 420R;

DETAILED DESCRIPTION OF EMBODIMENTS

Figure 1:
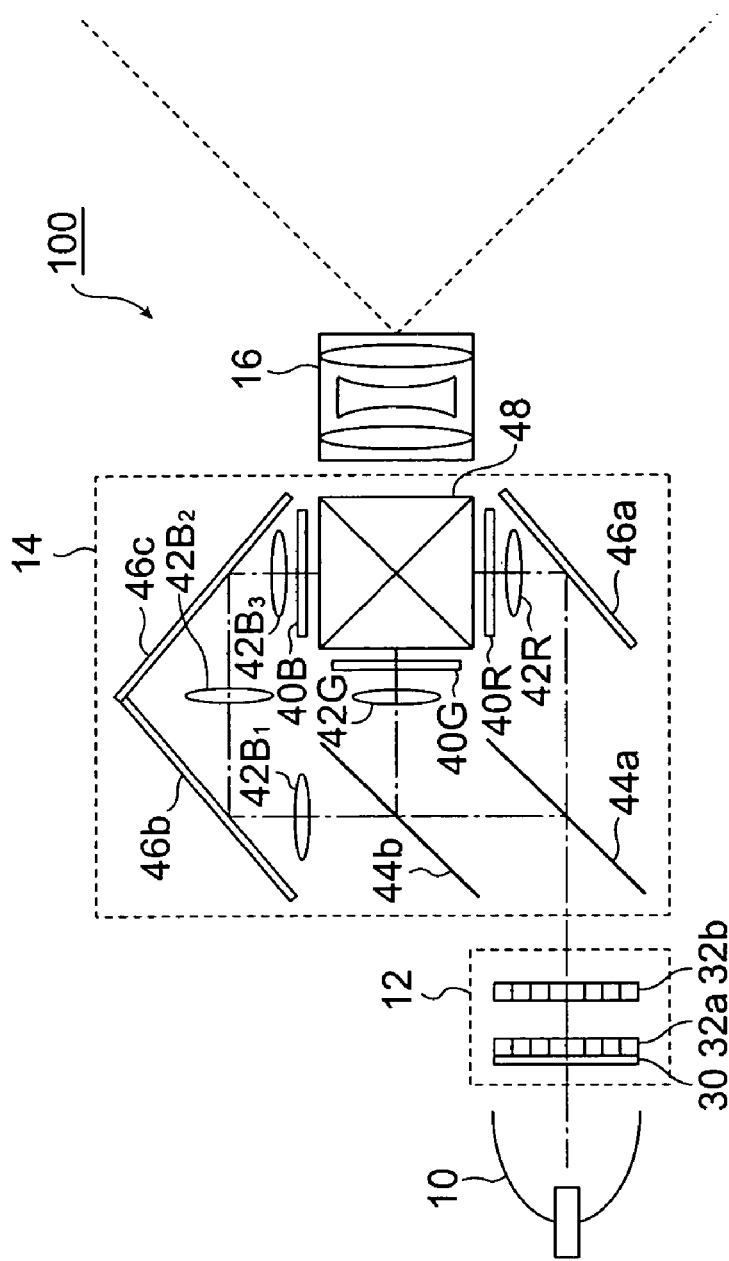
FIG. 1 is a schematic block diagram showing a hardware configuration of a projection display apparatus 100.

Referring to the drawings, explanations will be now made on an exemplary embodiment of the present invention. FIGS. 1 to 17 are figures illustrating the exemplary embodiments of a light propagation characteristic control apparatus, optical display apparatus, light propagation characteristic control program, optical display apparatus control program, light propagation characteristic control method and optical display apparatus control method, according to exemplary embodiments of the invention.

The present exemplary embodiment is an application of the light propagation characteristic control apparatus, optical display apparatus, light propagation characteristic control program, optical display apparatus control program, light propagation characteristic control method and optical display apparatus control method of exemplary embodiments of the invention, to a projection display apparatus 100, as shown in FIG. 1.

Referring to FIG. 1, explanation is first made on the structure of the projection display apparatus 100.

FIG. 1 is a schematic block diagram showing a hardware construction of the projection display apparatus 100.

The projection display apparatus 100 is constructed, as shown in FIG. 1, with a light source 10, an intensity modulator section 12 to modulate the light intensity in the entire wavelength region of light incident from the light source 10, a color modulator section 14 to modulate the light intensity of RGB primary colors in a wavelength region of light incident from the intensity modulator section 12, and a projector section 16 to project onto a screen (not shown) the light incident from the color modulator section 14.

The intensity modulator section 12 is made up with a liquid-crystal light valve 30 having a plurality of pixels independently controllable in transmissivity and arranged in a matrix form, and two fly-eye lenses 32a, 32b. The light from the light source 10 is modulated in intensity over the entire wavelength region by the liquid-crystal light valve 30. The modulated light is exited to the color modulator section 14 through the fly-eye lenses 32a, 32b.

The color modulator section 14 is made up by three liquid-crystal light valves 40R, 40G, 40B having a plurality of pixels independently controllable in transmissivity and arranged in a matrix form to have a higher resolution than that of the liquid-crystal light valve 30, five field lens 42R, 42G, 42B$_1$-42B$_3$, two dichroic mirrors 44a, 44b, three mirrors 46a, 46b, 46c and a dichroic prism 48. At first, the light from the intensity modulator section 12 is separated into RGB three primary colors of red, green and blue by the dichroic mirrors 44a, 44b and then incident on the liquid-crystal light valves 40R-40B through the field lenses 42R, 42G, 42B$_1$-42B$_3$ and mirrors 46a-46c. Then, the separated light intensities of RGB three primary colors are respectively modulated by the liquid-crystal light valves 40R-40B. The modulated RGB three primary colors of light are collected together by the dichroic prism 48 and exited to the projector section 16.

The liquid-crystal light valves 30, 40R-40B are active-matrix liquid-crystal display devices having a TN liquid crystal sandwiched between a glass substrate formed with a matrix form of pixel electrodes and switching elements, such as thin-film transistor elements and thin-film diodes, to drive them and a glass substrate formed with a common electrode over the entire surface thereof, wherein a polarizer plate is arranged on an outer surface thereof. The liquid-crystal light valves 30, 40R-40B operate on normally white mode. Namely, it takes a white/light (transmission) state under non-application of voltage and a black/dark (non-transmission) state under application of voltage, thus being placed under analog-control to have an intensity level between them according to a given control value.

Meanwhile, the projection display apparatus 100 has a display control apparatus 200 (not shown) to control the liquid-crystal light valve 30 and liquid-crystal light valves 40R-40B. Hereinafter, the liquid-crystal light valves 40R-40B are generally referred to as color-modulation light valves while the liquid-crystal light valve 30 is referred to as an intensity-modulation light valve in order to distinguish it from the color-modulation light valve. In this exemplary embodiment, the color-modulation light valve decides a resolution of display (resolution to be perceived by the observer who is viewing an image on the projection display apparatus 100).

Referring to FIGS. 2 to 6, the structure of the display control apparatus 200 is now explained in detail.

Figures 2, 3:
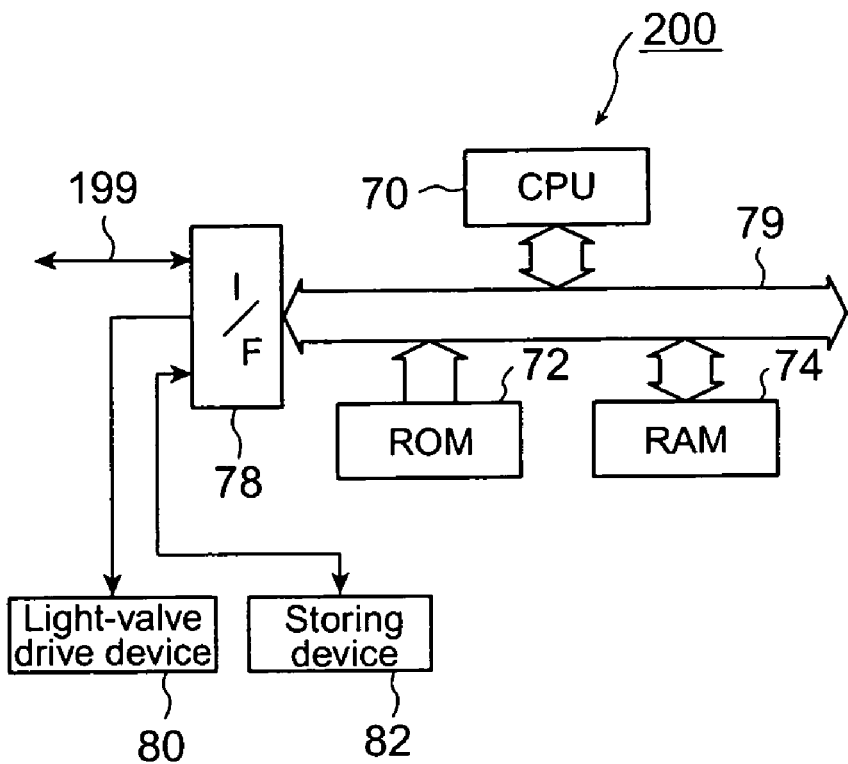
FIG. 2 is a schematic block diagram showing a hardware configuration of a display control apparatus 200.
FIG. 3 is a figure showing a data structure of a control-value library table 400.

FIG. 2 is a schematic block diagram showing a hardware configuration of the display control apparatus 200.

The display control apparatus 200 is constructed, as shown in FIG. 2, by a CPU 70 for control of operation and system overall according to a control program, a ROM 72 previously storing a control program, etc. for the CPU 70 in a predetermined domain, a RAM 74 for storing data read out of the ROM 72, etc. or an operation result required in the course of operation in the CPU 70, and an I/F 78 mediating to input/output data to/from external apparatuses. These are mutually connected for exchange of data through a bus 79 as a signal line for data transfer.

The I/F 78 is connected with, as external devices, a light-valve drive device 80 to drive the intensity-modulation light valve and color-modulation light valve, a storing device 82 to store data, table, etc. as files, and a signal line for connection to the external network 199.

The storing device 82 is stored with HDR display data.

HDR display data is image data capable of realizing a high-intensity dynamic range not to be realized by the related art sRGB image format or the like, storing pixel values representative of intensity levels of all the pixels of an image. At present, it is used particularly in the CG world, to synthesize a CG object with the actual scene. Although there are various image forms, those mostly are of the form storing pixel values on the floating-point scheme in order to realize a higher light-intensity dynamic range than the related art image format of sRGB or the like. Meanwhile, it is also a feature that storage value is a value related to physical radiance (W/(sr·m$^2$)) not taking account of human visual characteristic or to luminance (cd/m$^2$) taking account of human visual characteristic. In this exemplary embodiment, HDR display data uses a form storing, as floating-point values, pixel values representing radiance levels based on RGB three primary colors of one pixel. For example, a value (1.2, 5.4, 2.3) is stored as a pixel value as to one pixel.

HDR display data is generated by taking an HDR image in a high light-intensity dynamic range and based on the HDR image thus taken. However, with the film camera or digital still camera presently available, it is impossible to take, at one time, an HDR image having a high light-intensity dynamic range in the natural world. For this reason, one HDR image is generated from a plurality of photographic images changed in exposure by a certain way. Incidentally, the HDR display data generation method is detailed in related art document "P. E. Debevec, J. Malik, "Recovering High Dynamic Range Radiance Maps from Photographs", Proceedings of ACM SIGGAPH97, pp.367-378 (1997)", for example.

Meanwhile, the storing device 82 is stored with a control-value library table 400 in which control values of the intensity-modulation light valve are registered.

FIG. 3 is a figure showing a data structure of the control-value library table 400.

In the control-value library table 400, one record is registered per control value of the intensity-modulation light valve, as shown in FIG. 3. Each record is constituted including a field registered with a control value of the intensity-modulation light valve and a field registered with a transmissivity of the intensity-modulation light valve.

In the example of FIG. 3, the first-staged record has entries of "0" as a control value and "0.003" as a transmissivity. This indicates that outputting a control value "0" to the intensity-modulation light valve gives a transmissivity 0.3% of the intensity-modulation light valve. Although FIG. 3 showed the case that the intensity-modulation light valve has the number of levels of 4 bits (0-15 values), actually there are registered records corresponding to the number of levels of the intensity-modulation light valve. For example, for the number of levels of 8 bits, 256 records are to be registered.

Meanwhile, the storing device 82 is stored, for each color-modulation light valve, with control value library tables 420R, 420G, 420B having entries of control values of the relevant intensity-modulation light valve.

FIG. 4 is a figure showing a data structure of the control-value library table 420R.

In the control-value library table 420R, one record is registered per control value for the liquid-crystal light valve 40R, as shown in FIG. 4. Each record is constituted including a field registered with a control value of the liquid-crystal light valve 40R and a field registered with a transmissivity of the liquid-crystal light valve 40R.

In the example of FIG. 4, the first-staged record has entries of "0" as a control value and "0.004" as a transmissivity. This indicates that outputting a control value "0" to the liquid-crystal light valve 40R gives a transmissivity 0.4% of the liquid-crystal light valve 40R. Although FIG. 4 showed the case that the color-modulation light valve has the number of levels of 4 bits (0-15 values), actually there are registered records in the number corresponding to the number of levels on the color-modulation light valve. For example, for the number of levels of 8 bits, 256 records are to be registered.

Meanwhile, although not especially shown is a data structure of the control-value library tables 420G, 420B, they have a similar data structure to the control-value library table 420R. However, the difference from the control-value library table 420R lies in a difference of the transmissivity corresponding to the same control value.

Next, explanation is made on the configuration of the CPU 70 and the process to be executed by the CPU 70.

Figure 5:
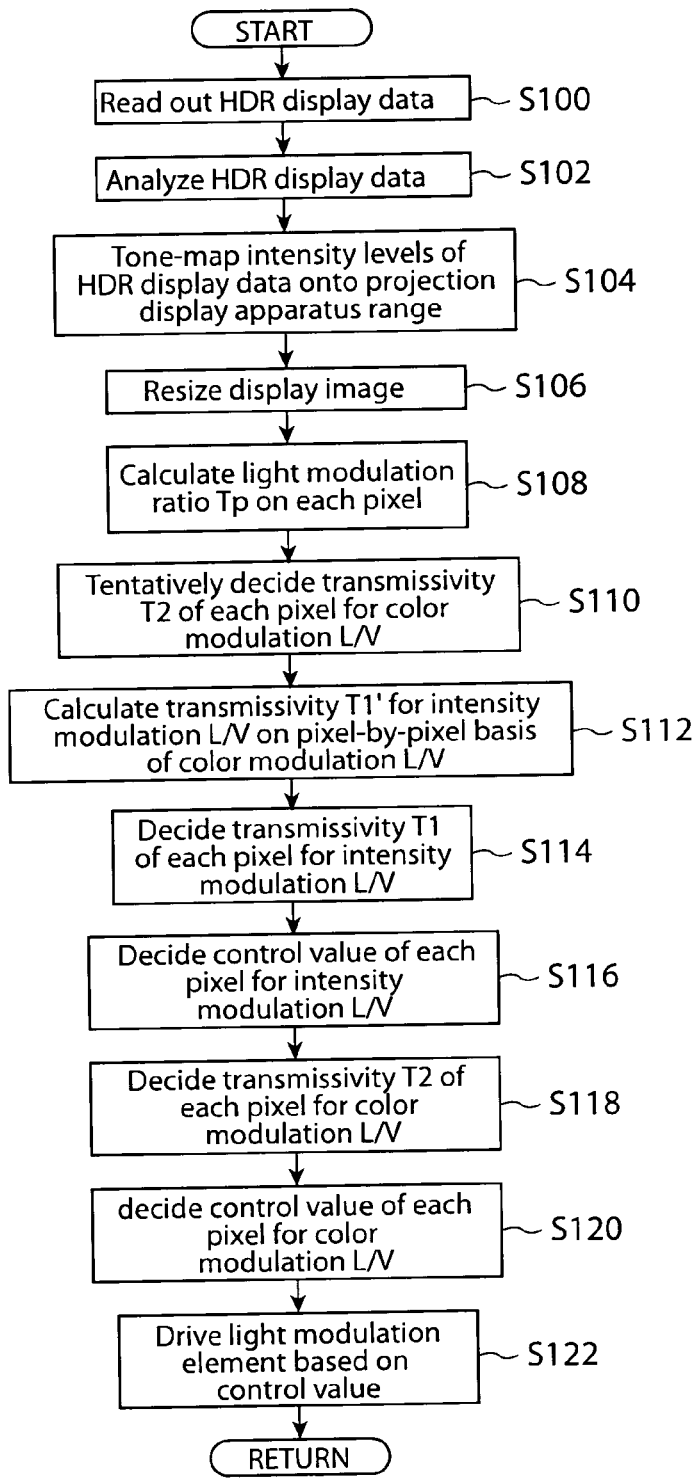
FIG. 5 is a flowchart showing a display control process.

The CPU 70 includes a micro-processing unit (MPU) or the like, to start up a predetermined program stored in a predetermined domain of the ROM 72 and execute a display control process shown in a flowchart of FIG. 5.

FIG. 5 is a flowchart showing the display control process.

The display control process is a process to decide control values respectively of the intensity-modulation light valve and the color-modulation light valve depending upon HDR display data and thereby drive the intensity-modulation light valve and color-modulation light value depending upon the decided control values. In the case it is executed in the CPU 70, the process first moves to step S100 as shown in FIG. 5.

At step S100, HDR display data is read out of the storing device 82.

Then, the process moves to step S102 to analyze the HDR display data read out and calculate a maximum value Rmax, a minimum value, a mean value, etc. of intensity levels of each color while taking account of a pixel-value histogram and a while point. The analysis result is for use in automatic image correction, e.g. lightening a darker scene, darkening an excessively light scene, and enhancing a middle-contrasted zone, or for use in tone mapping.

Next, the process moves to step S104 where the intensity levels of HDR display data are tone-mapped onto the light-intensity dynamic range of the projection display apparatus 100 based on the analysis result in step S102.

Figure 6:
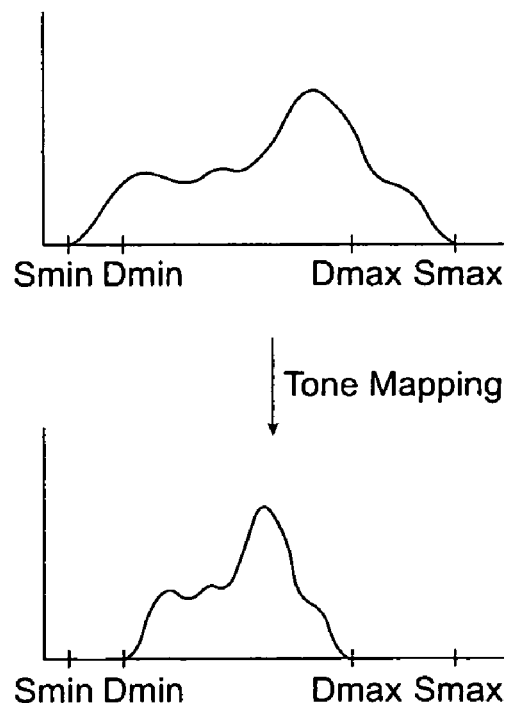
FIG. 6 is a schematic showing a tone mapping process.

FIG. 6 is a figure for explaining the process of tone mapping process.

It is assumed that, as a result of analyzing HDR display data, the intensity levels included in the HDR display data have a minimum value of Smin and a maximum value of Smax. Meanwhile, the projection display apparatus 100 assumably has a light-intensity dynamic range having a minimum value of Dmin and a maximum value of Dmax. In the example of FIG. 6, because Smin is smaller than Dmin and Smax is greater than Dmax, it is impossible to suitably display the HDR display data as it is. Consequently, normalization is made to place the histogram of Smin-Smax to within the range of Dmin-Dmax.

Incidentally, tone mapping is detailed in related art document "F. Drago, K. Myszkowski, T. Annen, N. Chiba, "Adaptive Logarithmic Mapping For Displaying High Contrast Scenes", Eurographics 2003, (2003)", for example.

Then, the process moves to step S106 where the HDR image is resized (expanded or contracted) to a resolution of the color-modulation light valve. At this time, the HDR image is resized while keeping the aspect ratio of the HDR image. Resize techniques include, for example, mean-value method, intermediate-value method and nearest-neighbor method.

Then, the process moves to step S108 where light modulation ratio Tp is calculated on each pixel of the resized image by use of the above equation (1), depending upon an intensity level Rp of each pixel of the resized image and radiance Rs of the light source 10.

Then, the process moves to step S110, to take as Rp an intensity level at pixel p of the resized image, as Rmax a maximum intensity level, as n an intensity level at pixel p of the color-modulation light valve, as m a coefficient in accordance with the number of levels of the color-modulation light valve and as γ a gamma coefficient, thus calculating an intensity level n by use of the following equations (3) and (4). This is carried out on all the pixels of the color-modulation light valve, based on RGB three primary colors.

$$Rp = Rmax \times (n/m)^\gamma \quad (3)$$

$$n = \exp((\log(Rp) - \log(Rmax))/\gamma + \log(m)) \quad (4)$$

Then, tentatively decided is a transmissivity T2 of each pixel of the color-modulation light valve depending upon a calculated intensity level n. Because the intensity level n corresponds to a control value for the color-modulation light valve, it is satisfactory to read a transmissivity corresponding to the intensity level n out of the control-value library tables 420R-420B.

Then, the process moves to step S12 where the transmissivity T1' of the intensity-modulation light valve is calculated on a pixel-by-pixel basis of the color-modulation light valve by use of the above equation (2), depending upon the calculated light modulation ratio Tp, the tentatively decided transmissivity T2 and the gain G. Here, because the color-modulation light valve is constituted by three liquid-crystal light valves 40R-40B, the transmissivity T1' is calculated based on RGB three primary colors as to a same pixel. Contrary to this, because the intensity-modulation light valve is constituted by one liquid-crystal light valve 30, a mean value of those, etc. is calculated as T1' of the relevant pixel.

Then, the process moves to step S114 where, for each pixel of the intensity-modulation light valve, a weighted mean value of the transmissivities T1' calculated on the pixel of color-modulation light valve overlapping, on the optical path, with the relevant pixel, as a transmissivity T1 of the relevant pixel. Weighting is by the area ratio of the overlapped pixels.

Then, the process moves to step S116 where, for each pixel of the intensity-modulation light valve, a control value corresponding to the transmissivity T1 calculated on that pixel is read out of the control-value library table 400. The control value thus read out is decided as a control value at the relevant pixel. In reading out a control value, a transmissivity most approximate to the calculated transmissivity T1 is searched through the control-value library table 400, to thereby read out a control value corresponding to the transmissivity found out by the search. By performing the search with using, for example, the dichotomizing search technique, rapid search is to be realized.

Then, the process moves to step S118 where, for each pixel of the color-modulation light valve, calculated is a weighted mean value of the transmissivities T1 decided on the pixel of intensity-modulation light valve overlapping, on the optical path, with that pixel. Based on the calculated mean value, the light modulation ratio Tp calculated at step S108 and the gain G, a transmissivity T2 of the pixel is calculated by use of the foregoing equation (2). Weighting is by the area ratio of the overlapped pixels.

Then, the process moves to step S120 where, for each pixel of the color-modulation light valve, a control value corresponding to the transmissivity T2 calculated on that pixel is read out of the control-value library tables 420R-420B. The control value thus read out is decided as a control value at the relevant pixel. In reading out a control value, a transmissivity most approximate to the calculated transmissivity T2 is searched through the control-value library tables 420R-420B, to read out a control value corresponding to the transmissivity found out by the search. By performing the search with using, for example, the dichotomizing search technique, rapid search is to be realized.

Then, the process moves to step S122 where the control values decided at steps S16, S120 are outputted to the light-valve drive device 80, thereby driving the intensity-modulation light valve and the color-modulation light valve and projecting a display image. Thus, the process in series is ended for return to the former process.

Referring to FIGS. 7 to 17, explanation is made on the operation of the present exemplary embodiment.

In the below, explanation is by an exemplification that any of the color-modulation light valves has a resolution of horizontally 18 pixels×vertically 12 pixels and the number of levels of 8 bits while the intensity-modulation light valve has a resolution of horizontally 15 pixels×vertically 10 pixels and the number of levels of 8 bits.

In the display control apparatus 200, HDR display data is read out through steps S100-S104 and the HDR display data thus read out is placed under analysis. Depending upon a result of the analysis, the intensity levels of HDR display data are tone-mapped onto the light-intensity dynamic range of the projection display apparatus 100. Then, through step S106, the HDR image is resized to the resolution of the color-modulation light valve.

Next, through step S108, light modulation ratio Tp is calculated for each pixel of the resized image. For example, the light modulation ratio Tp of the resized-image pixel p is given as (1.2, 5.4, 2.3)/(10000, 10000, 10000)=(0.00012, 0.00054, 0.00023) provided that the pixel p has an intensity level Rp (R, G, B) of (1.2, 5.4, 2.3) and the light source 10 has an radiance Rs (R, G, B) of (10000, 10000, 10000).

Figure 7:
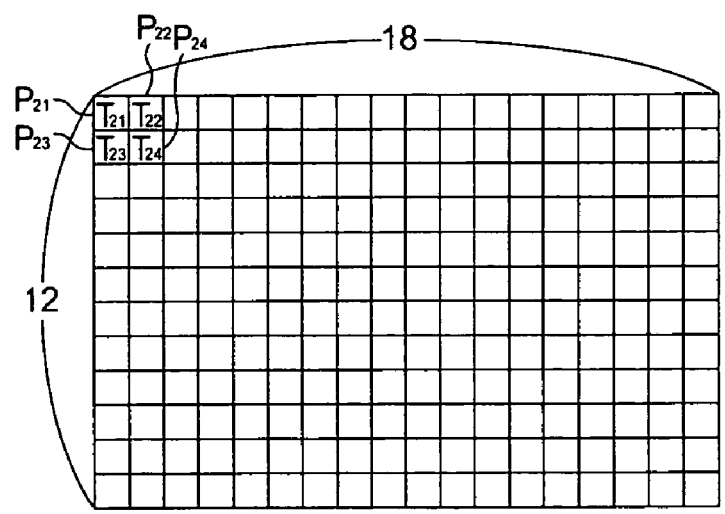
FIG. 7 is a schematic showing the case of tentatively deciding a transmissivity T2 of a color-modulation light valve.

FIG. 7 is a schematic figure showing a case to tentatively decide a transmissivity T2 of the color-modulation light valve.

Then, through step S110, tentatively decided is a transmissivity T2 of each pixel of the color-modulation light valve. Provided that the upper left 4 segments of the color-modulation light valve are denoted as p21 (upper left), p22 (upper right), p23 (lower left) and p24 (lower right), then the intensity level n on the pixel p21 is calculated by use of the above equations (3) and (4) when taking as Rp the intensity level at the pixel corresponding to the pixel p21 of the resized image. Then, the transmissivity corresponding to the calculated intensity level n is read out of the control-value library tables 420R-420B. Thus, the read-out transmissivity is provided for a transmissivity T21 of the pixel p21, as shown in FIG. 7. The transmissivities T22-T24 of the pixels p22-p24 can also be determined by calculating the intensity levels n by the above equations (3) and (4), similarly to the pixel p21.

Figure 8:
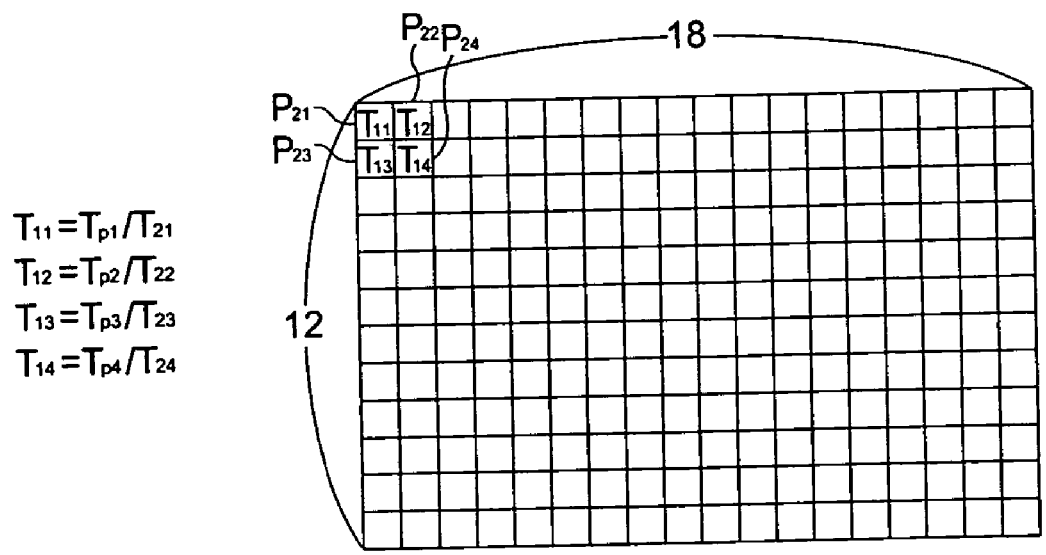
FIG. 8 is a schematic showing the case of calculating a transmissivity T1' of an intensity-modulation light valve on a pixel-by-pixel basis of the color-modulation light valve.
Figure 9:
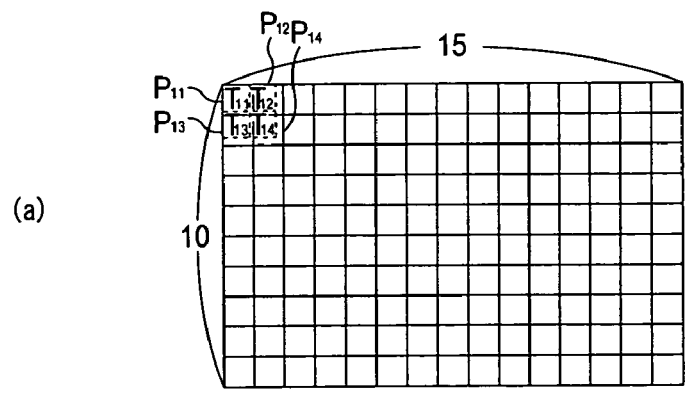
FIGS. 9(a)-(c) are schematics showing the case of deciding a transmissivity T1 of each pixel of the intensity-modulation light valve.
Figure 9:
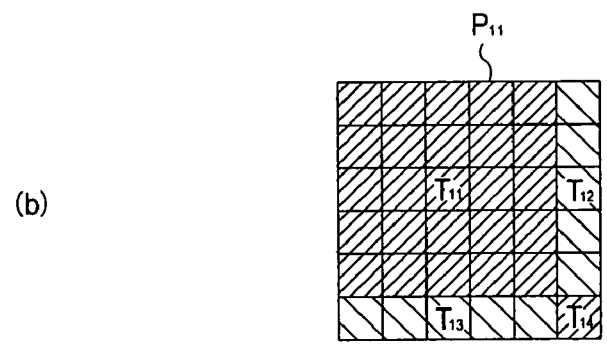
Figure 9:
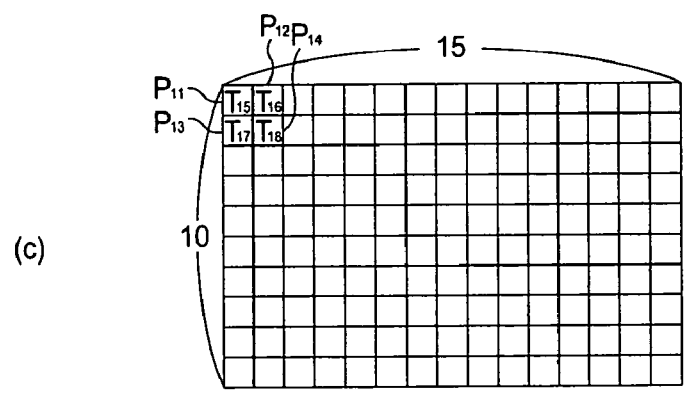
Figure 10:
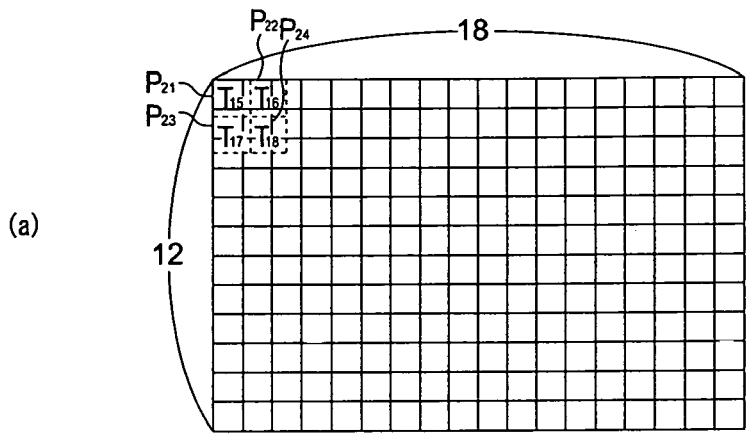
FIGS. 10(a)-(c) are schematics showing the case of deciding a transmissivity T2 of each pixel of the color-modulation light valve.
Figure 10:
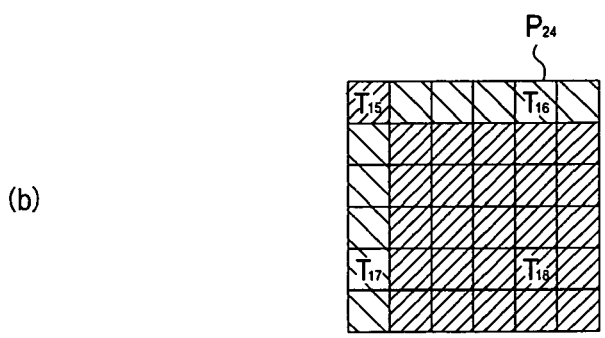
Figure 10:
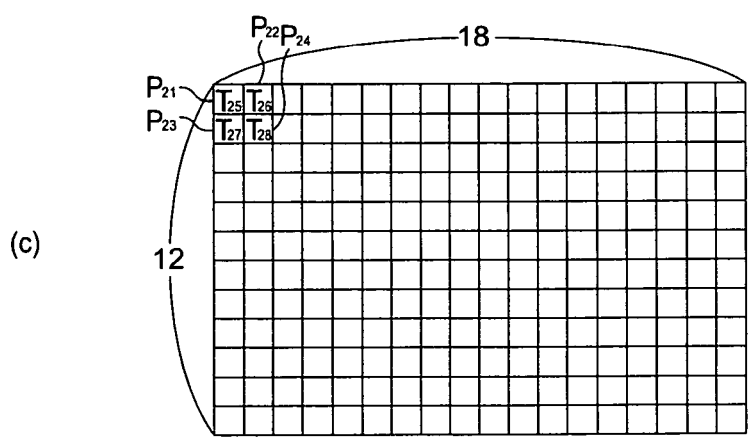

FIG. 8 is a schematic figure showing a case to calculate a transmissivity T1' of the intensity-modulation light valve on a pixel-by-pixel basis of the color-modulation light valve.

Then, through step S112, a transmissivity T1' of the intensity-modulation light valve is calculated on a pixel-by-pixel basis of the color-modulation light valve. In the case putting the eye on the pixels p21-p24, the corresponding transmissivities T11-T14 of the intensity-modulation light valve can be calculated by the following equations (5)-(8) as shown in FIG. 8 provided that the pixels p21-p24 have light modulation ratios of Tp1-Tp4 and a gain G of "1".

By using numerals, calculation is made actually. In the case of Tp1=0.00012, Tp2=0.05, Tp3=0.03, Tp4=0.01, T21=0.1, T22=0.2, T23=0.3 and T24=0.4, the following equations (5)-(8) provide T11=0.0012, T12=0.25, T13=0.1 and T14=0.025.

$$T11 = Tp1/T21 \quad (5)$$

$$T12 = Tp2/T22 \quad (6)$$

$$T13 = Tp3/T23 \quad (7)$$

$$T14 = Tp4/T24 \quad (8)$$

FIGS. 9(a)-(c) are figures showing a case to decide a transmissivity T1 of each pixel of the color-modulation light valve.

Then, through step S114, decided is a transmissivity T1 of each pixel of the intensity-modulation light valve. Provided that the upper left four segments of the intensity-modulation light valve are denoted as p11 (upper left), p12 (upper right), p13 (lower left) and p14 (lower right), then the pixel p11 lies overlapping, on the optical path, with the pixels p21-p24 because of different resolution between the color-modulation light valve and the intensity-modulation light valve as shown in FIG. 9(a). Because the color-modulation light valve has a resolution of 18×12 and the intensity-modulation light valve has a resolution of 15×10, the pixel p11 can be segmented as 6×6 rectangular domains by virtue of its least common multiple. The pixel p11 and the pixels p21-p24 have an overlapping area ratio of 25:5:5:1 as shown in FIG. 9(b). Accordingly, the transmissivity T15 at the pixel p11 can be calculated by the following equation (9), as shown in FIG. 9(c).

By using numerals, calculation is made actually. In the case of T11=0.0012, T12=0.5, T13=0.2 and T14=0.002, the following equation (9) provides T15=0.1008.

$$T15 = (T11 \times 25 + T12 \times 5 + T13 \times 5 + T14 \times 1)/36 \quad (9)$$

As for the transmissivities T16-T18 at the pixels P12-P14, a weighted mean value by area ratio can be decided similarly to the pixel p11.

Then, through step S116, based on each pixel of the intensity-modulation light valve, read out is a control value corresponding to the transmissivity T1 calculated on the pixel from the control-value library table 400. The control value thus read out is decided as a control value at the relevant pixel. For example, because of T15=0.1008, the control-value library table 400 is looked up. Then, 0.09 comes as the most approximate value, as shown in FIG. 3. Consequently, "8" is read as a control value of the pixel p11 from the control-value library table 400.

FIGS. 10(a)-(c) are figures showing a case to decide a transmissivity T2 of each pixel of the color-modulation light valve.

Then, through step S118, decided is a transmissivity T2 of each pixel of the color-modulation light valve. Because of different resolution between the color-modulation light valve and the intensity-modulation light valve as shown in FIG. 10(a), the pixel p24 overlaps, on the light path, with the pixels p11-p14, as shown in FIG. 10(a). Because the color-modulation light valve has a resolution of 18×12 and the intensity-modulation light valve has a resolution of 15×10, the pixel p24 can be segmented into 5×5 rectangular domains by virtue of its least common multiple. The pixel p24 and the pixels p11-p14 have an overlapping area ratio of 1:4:4:16 as shown in FIG. 10(b). Accordingly, when putting the eye on the pixel p24, the corresponding transmissivity T19 of the intensity-modulation light valve can be calculated by the following equation (10). Then, the transmissivity T28 at the pixel p24, provided that the gain G is "1", can be calculated by the following equation (11) as shown in FIG. 10(c).

By using numerals, calculation is made actually. In the case of T15=0.09, T16=0.33, T17=0.15, T18=0.06 and Tp4=0.01, the following equations (10) and (11) provide T19=0.1188 and T28=0.0842.

$$T19=(T15\times1+T16\times4+T17\times4+T18\times16)/25 \quad (10)$$

$$T28=Tp4/T19 \quad (11)$$

For the transmissivities T25-T27 at the pixels P21-P23, a weighted mean value by area ratio can be decided similarly to the pixel p24.

Then, through step S120, for each pixel of the color-modulation light valve, read out is a control value corresponding to the transmissivity T2 calculated on that pixel from the control-value library tables 420R-420B. The control value thus read out is decided as a control value of the relevant pixel. For example, in the case that T28=0.0842 concerning the pixel p24 of the liquid-crystal light valve 40R, 0.07 is the most approximate value as shown in FIG. 4 when looking up the control-value library table 420R. Accordingly, "7" is read out as a control value of the pixel p24 from the control-value library table 420R.

Then, through step S122, the decided control value is outputted onto the light-valve drive device 80. This drives the intensity-modulation light valve and the color-modulation light valve, to project a display image.

Explanation is now made on an exemplary embodiment with the setting of a gamma coefficient γ=2.2, m=256.

Figure 11:
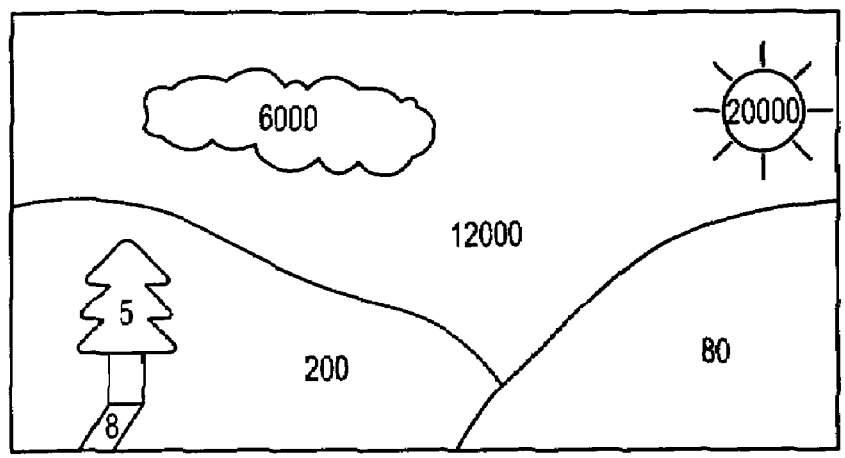
FIG. 11 is a schematic showing an intensity level distribution in a resized image.

FIG. 11 is a schematic figure showing an intensity level distribution on the resized image.

In the resized image of FIG. 11, the intensity level Rp is "20000" at the sun, the intensity level Rp is "12000" at the sky, the intensity level Rp is "6000" at the cloud, the intensity level Rp is "200" at the mountain on the left, the intensity level Rp is "80" at the mountain on the right, the intensity level Rp is "5" at the tree and the intensity level Rp is "8" at the shade of tree. Accordingly, the maximum intensity level Rmax is given as "20000".

Figure 12:
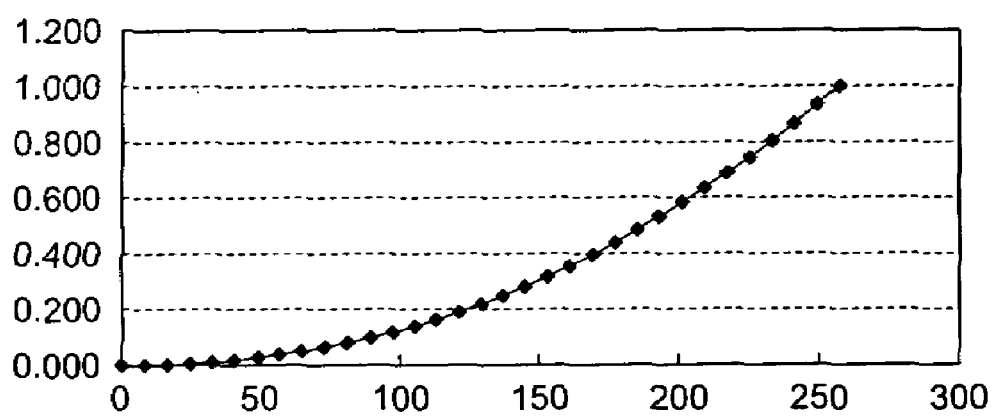
FIG. 12 is a graph showing a gamma characteristic in the case of setting at a gamma coefficient $\gamma=2.2$, m=256.

FIG. 12 is a graph showing a gamma characteristic with the setting of a gamma coefficient γ=2.2, m=256.

Figure 13:
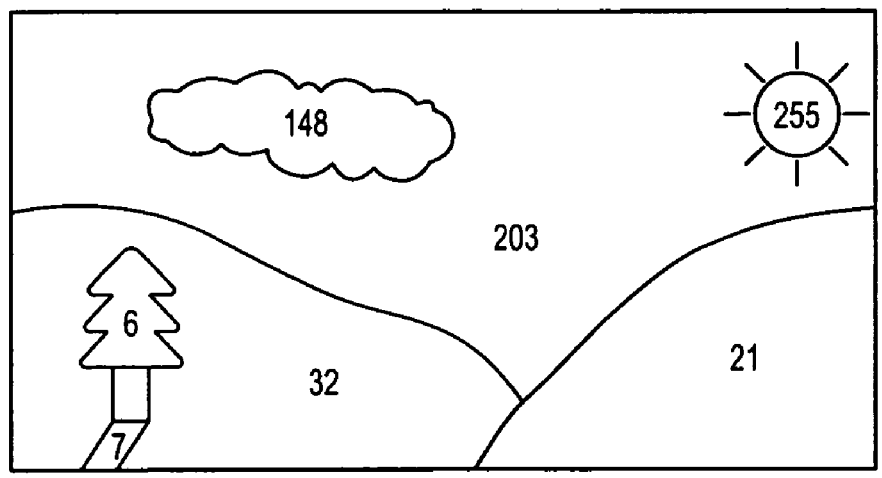
FIG. 13 is a schematic showing an intensity level distribution on an image formed by the color-modulation light valve.

FIG. 13 is a schematic figure showing an intensity level distribution of an image formed by the color-modulation light valve.

For the respective areas in the resized image of FIG. 11, in the case calculating the intensity levels n on the corresponding pixels of the color-modulation light valve by use of the gamma characteristic expression of FIG. 12, at first the intensity level n on the sun is given as "256". However, this value is beyond the number of levels "255" of the color-modulation light valve, it is set to the maximum value "255" as shown in FIG. 13. Meanwhile, the intensity level n on the sky is given "203", the intensity level n on the cloud is "148", the intensity level n on the mountain on the left is "32", the intensity level n on the mountain on the right is "21", the intensity level n on the tree is "6" and the intensity level n on the shade of tree is "7".

Explanation is now made on an exemplary embodiment with the setting of a gamma coefficient γ=2.2, m=1024.

Figure 14:
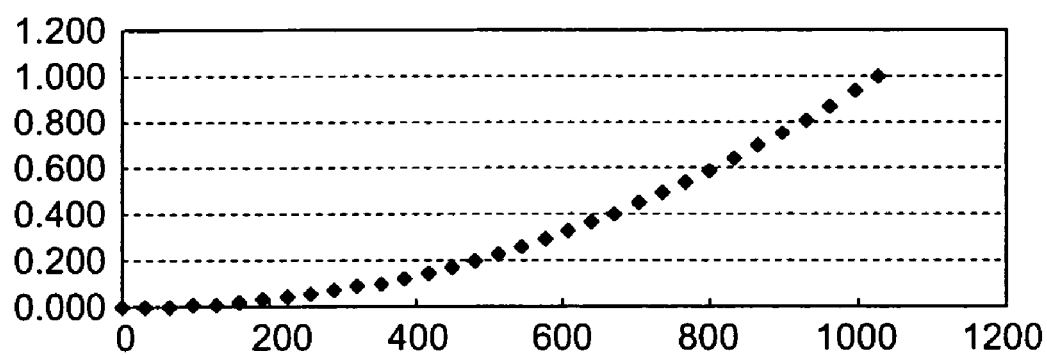
FIG. 14 is a graph showing a gamma characteristic in the case of setting at a gamma coefficient $\gamma=2.2$, m=1024.

FIG. 14 is a graph showing a gamma characteristic set with a gamma coefficient γ=2.2, m=1024.

Figure 15:
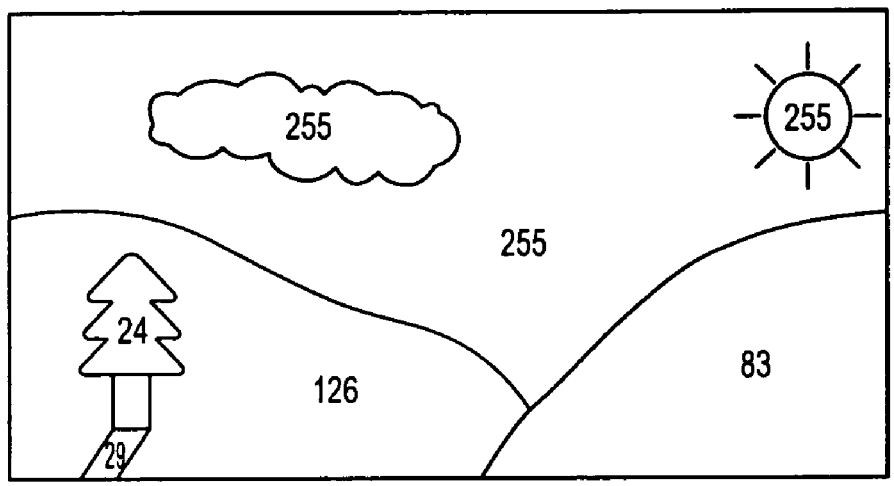
FIG. 15 is a schematic showing an intensity level distribution on an image formed by the color-modulation light valve.

FIG. 15 is a schematic figure showing an intensity level distribution formed by the color-modulation light valve.

For the respective areas in the resized image of FIG. 11, in the case calculating the intensity levels n of the corresponding pixels of the color-modulation light valve by use of the gamma characteristic expression of FIG. 14, at first the intensity level n on the sun is given as "1024". However, this value is beyond the number of levels "255" of the color-modulation light valve, it is set to the maximum value "255" as shown in FIG. 15. Likewise, the intensity levels n of the sky and the cloud are both set to the maximum value "255". Meanwhile, the intensity level n on the mountain on the left is given "126", the intensity level n on the mountain on the right is "83", the intensity level n on the tree is "24" and the intensity level n on the shade of tree is "29".

The sensitivity to intensity levels, in human visual perception, is higher in the lower region of intensity level (in the dark). Accordingly, the influence upon visual perception is greater rather by control of a color-modulation light valve decisive of the resolution of display, which enables the reproduction of dark intensity levels with greater detail. Contrary to this, the sensitivity to intensity levels, in human visual perception, is lower in the fully higher region of intensity level (in the light). There is less effect upon visual perception even by control of an intensity-modulation light valve. Therefore, this can reduce the possibility of deteriorated image quality.

Explanation is now made on an exemplary embodiment with the setting of a gamma coefficient γ=4.4, m=256.

Figure 16:
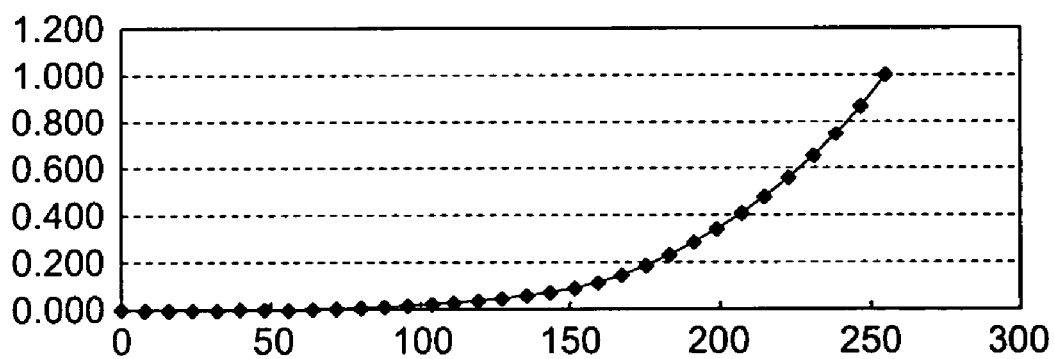
FIG. 16 is a graph showing a gamma characteristic in the case of setting at a gamma coefficient $\gamma=4.4$, m=256.

FIG. 16 is a graph showing a gamma characteristic set with a gamma coefficient γ=4.4, m=256.

Figure 17:
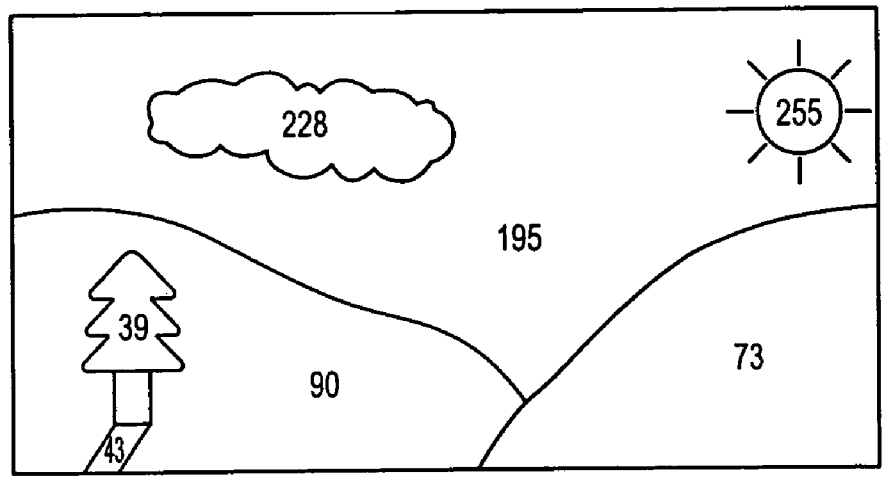
FIG. 17 is a schematic showing an intensity level distribution on an image formed by the color-modulation light valve.

FIG. 17 is a schematic figure showing an intensity level distribution formed by the color-modulation light valve.

For the respective areas in the resized image of FIG. 11, in the case calculating the intensity levels n on the corresponding pixels of the color-modulation light valve by use of the gamma characteristic expression of FIG. 16, at first the intensity level n on the sun is given as "256". However, this value is beyond the number of levels "255" of the color-modulation light valve, it is set to the maximum value "255" as shown in FIG. 17. Meanwhile, the intensity levels n of the sky is given as "228", the intensity level n on the cloud is "195", the intensity level n on the mountain on the left is "90", the intensity level n on the mountain on the right is "73", the intensity level n on the tree is "39" and the intensity level n on the shade of tree is "43".

The sensitivity to intensity levels, in human visual perception, is higher in the lower region of intensity level (in the dark). Accordingly, the influence upon visual perception is greater rather by control of a color-modulation light valve decisive of the resolution of display, which enables the reproduction of dark intensity levels with greater detail. Contrary to this, the sensitivity to intensity levels, in human visual perception, is lower in the fully higher region of intensity level (in the light). There is less effect upon visual perception even by control of an intensity-modulation light valve. Therefore, this can reduce the possibility to deteriorate image quality.

In this manner, this exemplary embodiment tentatively decides a transmissivity T2 of each pixel of the color-modulation light valve by the gamma characteristic expression depending upon the HDR display data. Based on the tentatively decided transmissivity T2 and the HDR display data, decided is a transmissivity T1 of each pixel of the intensity-modulation light valve. Based on the decided transmissivity T1, decided is a control value of each pixel of the intensity-modulation light valve. Based on the decided transmissivity T1 and the HDR display data, decided is a transmissivity T2 of each pixel of the color-modulation light valve. Based on the decided transmissivity T2, decided is a control value for each pixel of the color-modulation light valve.

Due to this, because the light from the light source 10 is modulated through the intensity-modulation and color-modulation light valves, it is possible to realize a comparatively high dynamic range and the number of levels. Meanwhile, because of deciding the transmissivity T2 of each pixel of the color-modulation light valve by use of the gamma characteristic expression, it is possible to obtain an image reduced in luminance and color irregularities and hence reduce the possibility to deteriorate image quality as compared to the related art. Furthermore, because the gamma characteristic expression is comparatively simple in operation, it is possible to comparatively rapidly determine a transmissivity T2 for each pixel of the color-modulation light valve. Furthermore, because of no necessity to hold intensity tables in the number corresponding to the number of levels, there is no substantial increase in the size and generation time of an intensity table as compared to the related art even when increasing the number of levels.

Furthermore, the present exemplary embodiment takes the intensity level on the pixel p of the resized image as Rp, the maximum intensity level as Rmax, the intensity level on the pixel p of the color-modulation light valve as n, the coefficient corresponding to the number of levels of the color-modulation light valve as m, and the gamma coefficient as γ, to calculate the intensity level n by use of the foregoing equations (3) and (4). Based on the calculated intensity level n, tentatively decided is a transmissivity T2 of the pixel corresponding to the pixel p of the color-modulation light valve.

Because this can obtain an image reduced in luminance and color irregularities, it is possible to further reduce the possibility of deteriorated image quality.

Furthermore, in the present exemplary embodiment, the coefficient m was set four times the number of levels of the color-modulation light valve.

This can precisely reproduce the dark intensity level of an image formed by the color-modulation light valve as compared to the case with a setting of the coefficient m at the number of levels of the color-modulation light valve, hence further reducing the possibility of deteriorated image quality.

Furthermore, the present exemplary embodiment set the gamma coefficient γ at 4 or greater.

This can precisely reproduce the dark intensity level of an image formed by the color-modulation light valve as compared to the case with a setting of the gamma coefficient γ at less than 4, thus further reducing the possibility of deteriorated image quality.

Furthermore, in the present exemplary embodiment, the color-modulation light valve is a light modulator element decisive of the resolution of display.

Because this allows to decide later the transmissivity T2 of the color-modulation light valve decisive of the resolution of display, it is possible to suppress the influence of error and further reduce the possibility to deteriorate image quality.

Furthermore, in the present exemplary embodiment, the transmissivity T1' of the intensity-modulation light valve is calculated on a pixel-by-pixel basis of the color-modulation light valve depending upon a tentatively decided transmissivity T2 and HDR display data. Depending upon a calculated transmissivity T1', calculated is the transmissivity T1 of each pixel of the intensity-modulation light valve.

Where the intensity-modulation light valve and the color-modulation light valve respectively have different resolutions, it is easier in process to calculate a transmissivity T1 of each pixel of the intensity-modulation light valve after once calculating a transmissivity T1' of the intensity-modulation light valve on a pixel-by-pixel basis of the color-modulation light valve depending upon a tentatively decided transmissivity T2, rather than directly calculating a transmissivity T1 of each pixel of the intensity-modulation light valve depending upon a tentatively decided transmissivity T2. Accordingly, in the case that the intensity-modulation light valve and the color-modulation light valve respectively have different resolutions, it is possible to comparatively easily calculate a transmissivity T1 of each pixel of the intensity-modulation light valve.

Furthermore, in the present exemplary embodiment, for each pixel of the intensity-modulation light valve, a transmissivity T1 of that pixel is calculated depending upon a transmissivity T1' calculated on the pixel of color-modulation light valve overlapping, on the optical path, with that pixel.

Due to this, when the intensity-modulation light valve and the color-modulation light valve respectively have different resolutions, the transmissivity T1 of each pixel of the intensity-modulation light valve is given a comparatively suitable value for the transmissivity T2 at the pixel of color-modulation light valve overlapping, on the optical path, with that pixel. Accordingly, it is possible to further reduce the possibility of deteriorated image quality. Also, it is possible to further easily calculate a transmissivity T1 of each pixel of the intensity-modulation light valve.

Furthermore, in the present exemplary embodiment, for each pixel of the intensity-modulation light valve, calculated is a weighted mean value of the transmissivities T1 calculated on the pixel of color-modulation light valve overlapping, on the optical path, with that pixel, as a transmissivity T1 of the relevant pixel.

Due to this, where the intensity-modulation light valve and the color-modulation light valve respectively have different resolutions, the transmissivity T1 of each pixel of the intensity-modulation light valve is given a further suitable value for the transmissivity T2 at the pixel of color-modulation light valve overlapping, on the optical path, with that pixel. Thus, it is possible to further reduce the possibility of deteriorated image quality. Also, it is possible to further easily calculate the transmissivity T1 of each pixel of the intensity-modulation light valve.

Furthermore, in the present exemplary embodiment, for each pixel of the color-modulation light valve, calculated is a transmissivity T2 of that pixel depending upon the transmissivity T1 decided on the pixel of intensity-modulation light valve overlapping, on the optical path, with that pixel.

Due to this, where the intensity-modulation light valve and the color-modulation light valve respectively have different resolutions, the transmissivity T2 of each pixel of the color-modulation light valve is given a comparatively suitable value for the transmissivity T1 at the pixel of intensity-modulation light valve overlapping, on the optical path, with that pixel. Thus, it is possible to further reduce the possibility of deteriorated image quality. Also, it is possible to comparatively easily calculate the transmissivity T2 of each pixel of the color-modulation light valve.

Furthermore, in the present exemplary embodiment, for each pixel of the color-modulation light valve, calculated is a weighted mean value of the transmissivities T1 decided on the pixel of intensity-modulation light valve overlapping, on the optical path, with the pixel, thereby calculating a transmissivity T2 of that pixel depending upon the mean value.

Due to this, where the intensity-modulation light valve and the color-modulation light valve respectively have different resolutions, the transmissivity T2 of each pixel of the color-modulation light valve is given a further suitable value for the transmissivity T1 at the pixel of intensity-modulation light valve overlapping, on the optical path, with that pixel. Thus, it is possible to further reduce the possibility of deteriorated image quality. Also, it is possible to comparatively easily calculate the transmissivity T2 of each pixel of the color-modulation light valve.

Furthermore, in the present exemplary embodiment, the intensity-modulation light valve is used as a first-staged light-modulation element and the color-modulation light valves are used as a second-staged light-modulation element, respectively.

Due to this, it is satisfactory to merely add one light-modulation element to the related art projection display apparatus. Therefore, the projection display apparatus 100 can be structured comparatively easily.

In the above exemplary embodiment, the intensity-modulation light valve corresponds to the first light-modulation element of exemplary embodiments 1, 2, 8, 10 to 12, 18, 20 to 22, 28 or 30 or to the entire wavelength regioned intensity-modulation element of exemplary embodiments 8, 18 or 28. Meanwhile, the color-modulation light valve corresponds to the second light-modulation element of exemplary embodiments 1 to 4, 7, 8, 10 to 14, 17, 18, 20 to 24, 27, 28 or 30 or to the particular wavelength regioned intensity-modulation element of exemplary embodiments 8, 18 or 28. Meanwhile, the step S110 corresponds to the light-propagation-characteristic tentative deciding device of exemplary embodiments 1 to 3, 11 to 13 or to the light-propagation-characteristic tentative deciding of exemplary embodiments 21 to 23 while the steps S112, S114 correspond to the first light-propagation-characteristic deciding device of exemplary embodiments 1, 2, 11 or 12 or to the first light-propagation-characteristic deciding of exemplary embodiments 21 or 22.

Meanwhile, in the above exemplary embodiment, the step S116 corresponds to the first control-value deciding device of exemplary embodiments 2 or 12 or to the first control-value deciding of exemplary embodiment 22 while the step S118 corresponds to the second light propagation-characteristic deciding device of exemplary embodiments 2 or 12 or to the second light propagation-characteristic deciding of exemplary embodiment 22. And the step S120 corresponds to the second control-value deciding device of exemplary embodiments 2 or 12 or to the second control-value deciding of exemplary embodiment 22.

Incidentally, in the above exemplary embodiment, the gamma coefficient γ was set at 4 or greater. However, this is not limitative, i.e. the gamma coefficient γ is preferably set at 0 or greater and ¼ or smaller.

Explanation is made on an exemplary embodiment with the setting of a gamma coefficient γ=¼, m=256.

Figure 18:
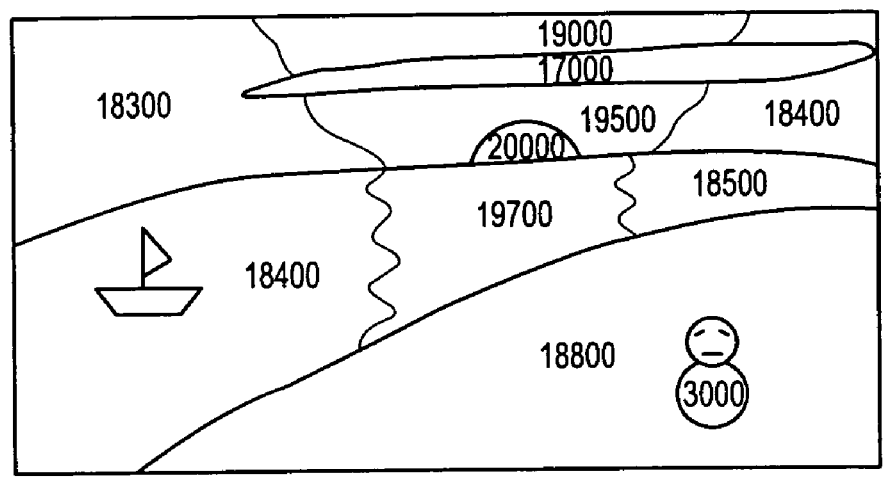
FIG. 18 is a schematic showing an intensity level distribution in a resized image.

FIG. 18 is a schematic figure showing an intensity level distribution formed on the resized image.

In the resized image of FIG. 18, the intensity level Rp on the sun is given as "20000", the intensity levels Rp on the sky are respectively "18300" (left), "19000" (upper center), "19500" (lower center) and "18400" (right), the intensity level Rp on the cloud is "17000", the intensity levels Rp on the sea are respectively "18400" (left), "19700" (center) and "18500" (right), the intensity level Rp on the land is "18800" and the intensity level Rp on the snowman is "3000". Accordingly, the maximum intensity level Rmax is given as "20000".

Figure 19:
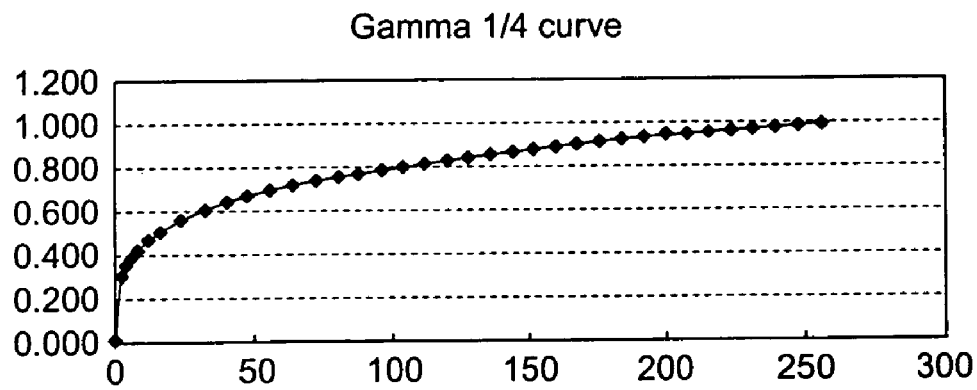
FIG. 19 is a graph graph showing a gamma characteristic in the case of setting at a gamma coefficient $\gamma=\frac{1}{4}$, m=256.

FIG. 19 is a graph showing a gamma characteristic in the case the gamma coefficient γ is set at γ=¼, m=256.

Figure 20:
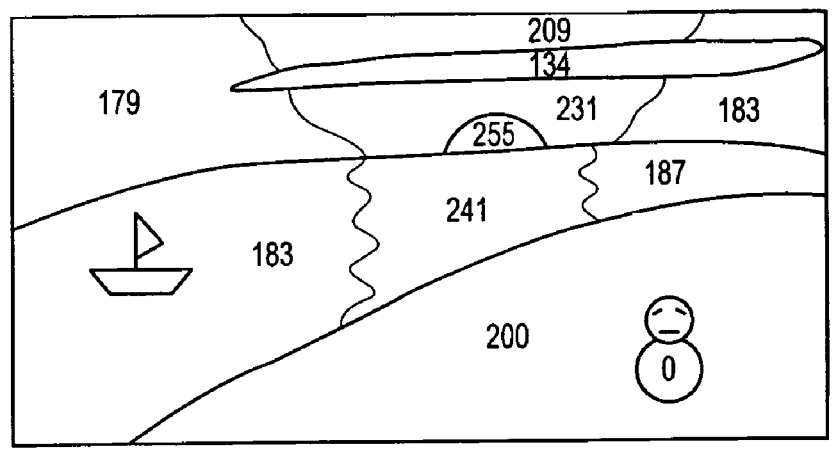
FIG. 20 is a schematic showing an intensity level distribution formed on an image by the color-modulation light valve.

FIG. 20 is a schematic figure showing an intensity level distribution of an image formed by the color-modulation light valve.

For the respective areas in the resized image of FIG. 18, in the case calculating the intensity levels n on the corresponding pixels of the color-modulation light valve by use of the gamma characteristic expression of FIG. 19, at first the intensity level n on the sun is given as "256". However, this value is beyond the number of levels "255" of the color-modulation light valve, it is set to the maximum value "255" as shown in FIG. 20. Meanwhile, the intensity levels n on the sky are respectively given as "179" (left), "209" (upper center), "231" (lower center) and "183" (right). The intensity level n on the cloud is "134" while the intensity levels n on the sea are respectively "183" (left), "241" (center) and "187" (right). The intensity level n on the land is given as "200" while the intensity level n on the snowball is given as "0".

Due to this, the light intensity level on an image formed by the color-modulation light valve can be reproduced precisely as compared to the case with a setting of the gamma coefficient γ at a negative value or a value greater than ¼.

Incidentally, in the above exemplary embodiment, because the intensity-modulation light valve was constituted by one liquid-crystal light valve 30, one control value library table 400 was prepared to decide a control value of each pixel of the intensity-modulation light valve depending upon the control-value library table 400. However, this is not limitative, i.e. control-value library tables 400R, 400G, 400B may be prepared based on RGB three primary colors, to decide a control value of each pixel of the intensity-modulation light valve depending upon the control-value library tables 400R, 400G, 400B. Because the intensity-modulation light valve is to modulate the intensity of light over the entire wavelength region, the control-value library table 400 is registered with light transmissivities at representative wavelengths. However, RGB three primary colors not necessarily have respective wavelengths not fallen under the transmissivities registered.

For this reason, for the intensity-modulation light valve, measurement is made for transmissivities corresponding to the control values based on RGB three primary colors, to thereby configure control-value library tables 400R-400B. Then, decided is a transmissivity T1 of each pixel of the intensity-modulation light valves based on RGB three primary colors, to search through the control-value library table 400R for a transmissivity most approximate to the transmissivity T1 calculated as to R. Thus, read out is a control value corresponding to the transmissivity found out by the search. Similarly, control values concerned are read out of the control-value library tables 400G, 400B on the basis of the transmissivity T1 calculated as to G and the transmissivity T1 calculated as to B. Then, calculated is a mean value, etc. of the control values read out as to a same pixel of the intensity-modulation light valve, as a control value of the relevant pixel.

Due to this, the control value of each pixel of the intensity-modulation light valve is given as a comparatively suited value for the transmissivity on RGB three primary colors at the pixel of color-modulation light valve overlapping, on the optical path, with that pixel. Thus, it is possible to further reduce the possibility of deteriorated image quality.

Meanwhile, in the above exemplary embodiment, the color-modulation light valve was structured as a light-modulation element decisive of the resolution of display. However, this is not limitative, i.e. the intensity-modulation light valve can be structured as a light-modulation element decisive of a resolution of display. In this case, after deciding a transmissivity T1 of each pixel of the color-modulation light valve (transmissivity is given T1 for the light-modulation element decided earlier), decided is a transmissivity T2 of each pixel of the intensity-modulation light valve (transmissivity is given T2 for the light-modulation element decided later). Meanwhile, similarly to the above, control-value library tables 400R-400B can be prepared based on RGB three primary colors, to decide a control value of each pixel of the intensity-modulation light valve depending upon the control-value library tables 400R-400B.

Specifically, the transmissivity T2 of each pixel of the intensity-modulation light valve is decided based on RGB three primary colors. Search is made through the control-value library table 400R for a transmissivity most approximate to the transmissivity T2 calculated as to R, to read out a control value corresponding to the transmissivity found out by the search. Similarly, a control value concerned is read out of the control-value library tables 400G, 400B, on the basis of the transmissivity T2 calculated as to G and the transmissivity T2 calculated as to B. Then, calculated is a mean value, etc. of the control values read out as to a same pixel of the intensity-modulation light valve as a control value of that pixel.

Due to this, because the control value of each pixel of the intensity-modulation light valve is given as a comparatively suitable value for the transmissivity based on RGB three primary colors at the pixel of color-modulation light valve overlapping, on the optical path, with that pixel. Thus, it is possible to further reduce the possibility of deteriorated image quality.

Figure 21:
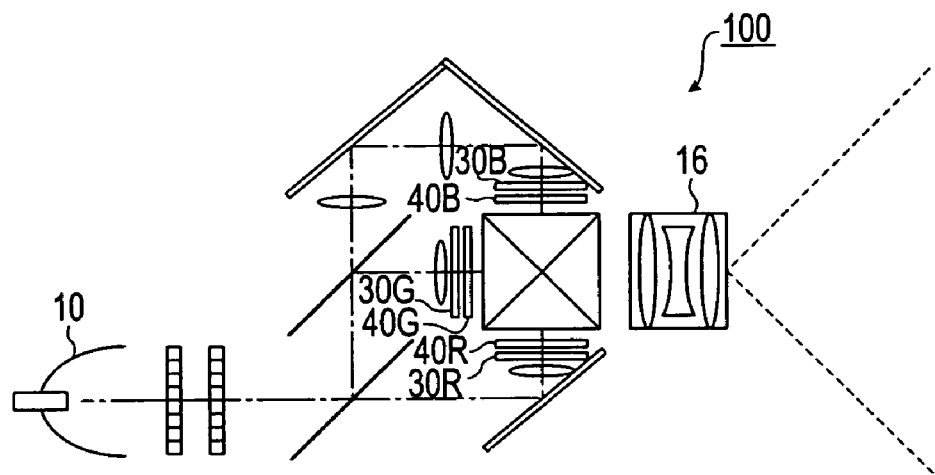
FIG. 21 is a schematic block diagram showing a hardware configuration in the case that a projection display apparatus 100 is structured by providing intensity-modulation light valve and color-modulation light valve based on each three primary colors of RGB.

Meanwhile, in the above exemplary embodiment, the projection display apparatus 100 had the intensity-modulation light valve structured by one liquid-crystal light valve 30. However, this is not limitative, i.e. liquid-crystal light valves 30R, 30G, 30B may be provided respectively on the incident sides of the liquid-crystal light valves 40R-40B, as shown in FIG. 21. In this case, the light modulator section for deciding a resolution of display may be any of the liquid-crystal light valves 30R-30B and the liquid-crystal light valves 40R-40B.

FIG. 21 is a schematic block diagram showing a hardware construction where a projection display apparatus 100 is structured with an intensity-modulation light valve and color-modulation light valve provided based on each three colors of RGB.

Due to this, because the intensity level based on RGB three primary colors can be modulated at two stages independently, it is possible to reduce the possibility of deteriorated image quality.

In this case, the liquid-crystal light valves 30R-30B, 40R-40B correspond to the first light-modulation element of exemplary embodiments 9, 11 or 29, to the second light-modulation element of exemplary embodiments 9, 19 or 29, or to the particular wavelength regioned intensity-modulation element of exemplary embodiments 9, 19 or 29.

Figure 22:
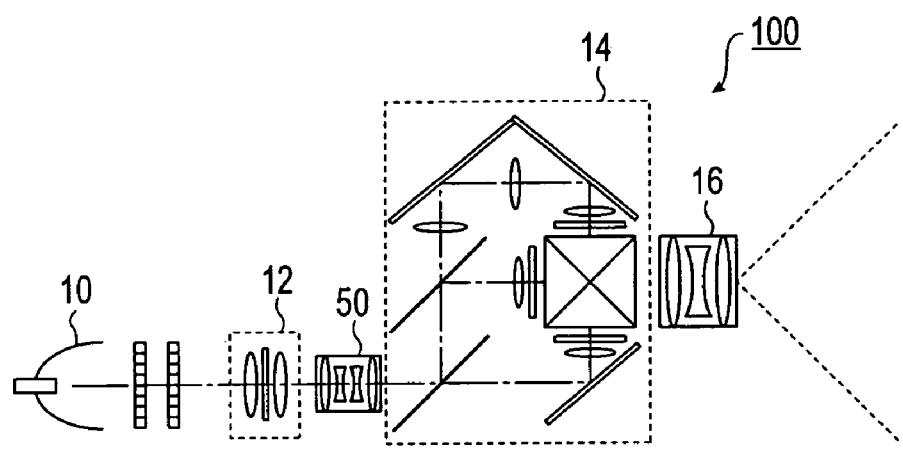
FIG. 22 is a schematic block diagram showing a hardware configuration in the case that a projection display apparatus 100 is structured by providing a relay lens 50 between the intensity modulator section 12 and the color modulator section 14.

In the above exemplary embodiment, the projection display apparatus 100 was structured by optically directly coupling the intensity modulator section 12 and the color modulator section 14 together. However, this is not limitative, i.e. a relay lens 50 can be structurally provided between the intensity modulator section 12 and the color modulator section 14, as shown in FIG. 22. In this case, the light modulator section to decide a resolution of display may be of any of the intensity modulator section 12 and the color modulator section 14.

FIG. 22 is a block diagram showing a hardware construction where a projection display apparatus 100 is structured by providing a relay lens 50 between the intensity modulator section 12 and the color modulator section 14.

Due to this, because the image by the intensity-modulation light valve can be accurately transferred onto the color-modulation light valve, the accuracy of focusing can be enhanced.

Figure 23:
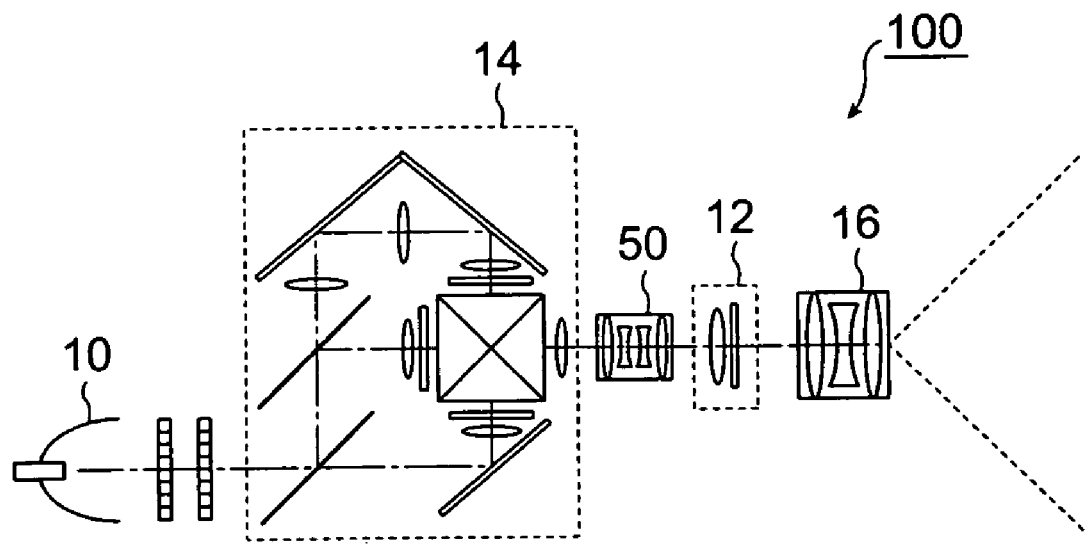
FIG. 23 is a schematic block diagram showing a hardware configuration in the case that a projection display apparatus 100 is structured by providing an intensity modulator section 12 on the light-exit side of the color modulator section 14.

In the above exemplary embodiment, the projection display apparatus 100 was structured by providing the color modulator section 14 on the light-exit side of the intensity modulator section 12. However, this is not limitative, i.e. it can be structured by providing the intensity modulator section 12 on the light-exit side of the color modulator section 14 as shown in FIG. 23. In this case, a relay lens 50 is preferably provided between the color modulator section 14 and the intensity modulator section 12 in order to enhance the accuracy of focusing. Meanwhile, the light modulator section for deciding a resolution of display may be any of the color modulator section 14 and the intensity modulator section 12.

FIG. 23 is a schematic block diagram showing a hardware construction where a projection display apparatus 100 is structured by providing an intensity modulator section 12 on the light-exit side of the color modulator section 14.

Figure 24:
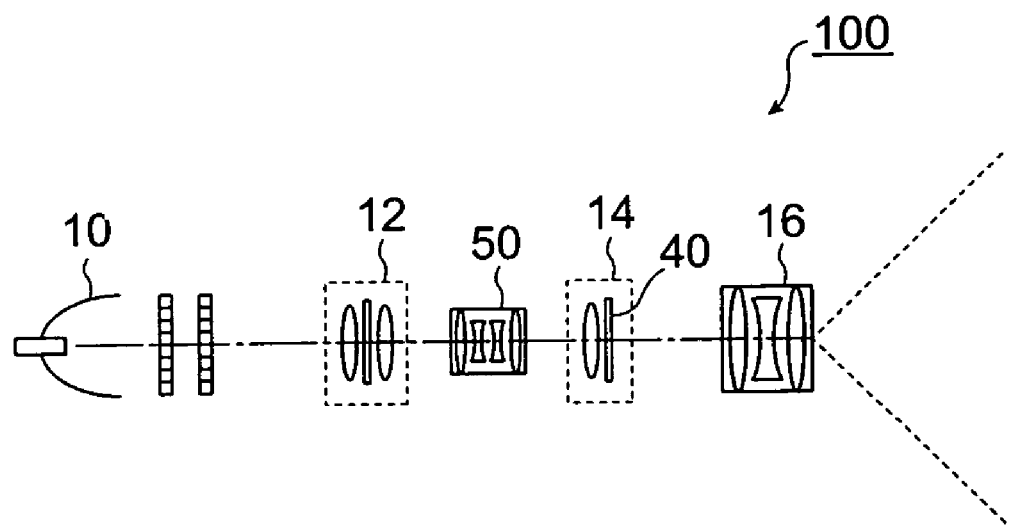
FIG. 24 is a schematic block diagram showing a hardware configuration in the case of structuring a projection display apparatus 100 as a single-plated type.

In the above structure, the projection display apparatus 100 had the color modulator section 14 made up as a three-plated type (scheme for color modulation by three liquid-crystal light valves 40R-40B). However, this is not limitative, i.e. it can be structured by making the color modulator section 14 as a single-plated type (scheme for color modulation by one liquid-crystal light valve 40) as shown in FIG. 24. The single-plated color-modulation light valve can be structured by providing a color filter on a liquid-crystal light valve. In this case, a relay lens 50 is preferably provided between the intensity modulator section 12 and the color modulator section 14 in order to enhance the accuracy of focusing. Meanwhile, the light modulator section for deciding a resolution of display may be any of the intensity modulator section 12 and the color modulator section 14.

FIG. 24 is a schematic block diagram showing a hardware construction where a projection display apparatus 100 is structured as a single-plated type.

Figure 25:
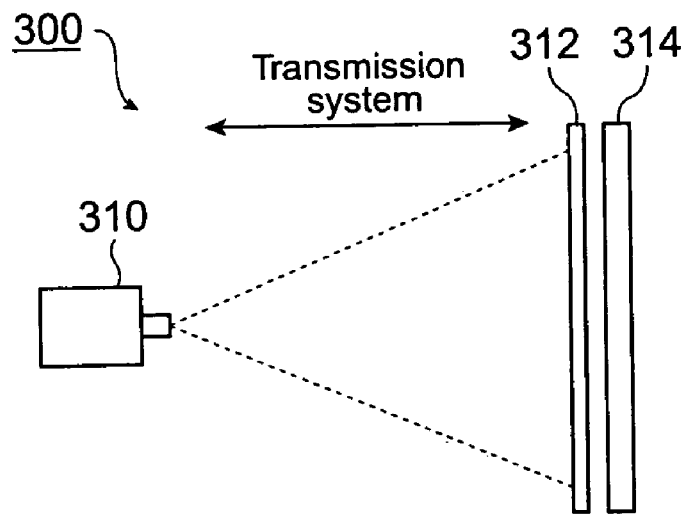
FIG. 25 is a schematic block diagram showing a hardware configuration of a projection display system 300.

In the above exemplary embodiment, the projection display apparatus 100 was structured by incorporating the intensity modulator section 12 and the color modulator section 14. However, this is not limitative, i.e. it can be structured as a projection display system 300 formed by a single-plated projection display 310 to modulate the intensity of light over the entire wavelength region, a flood Fresnel lens 312 for receiving the projection light from the single-plated projection display 310, and a color-modulation panel 314 provided on the light-exit side of the Fresnel lens 312 and to modulate the intensity of light based on RGB three primary colors, as shown in FIG. 25. In this case, the light modulator section for deciding a resolution of display may be any of a single-plated projection display 310 and a color modulator panel 314.

FIG. 25 is a schematic block diagram showing a hardware construction of a projection display system 300.

Figure 26:
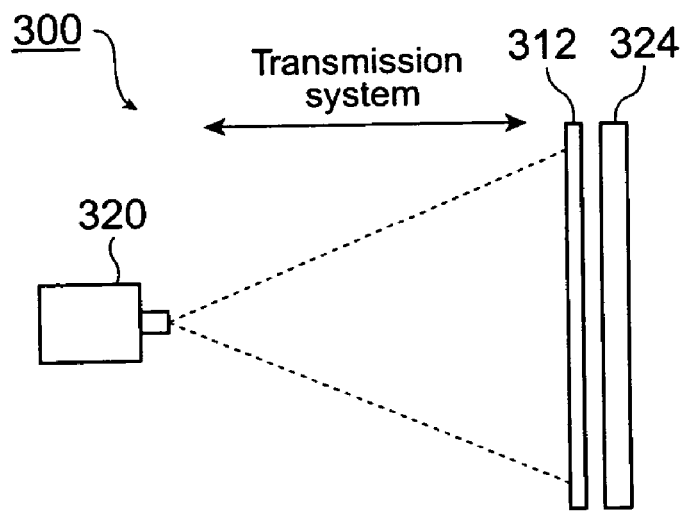
FIG. 26 is a schematic block diagram showing a hardware configuration of a projection display system 300.

In the above exemplary embodiment, the projection display apparatus 100 was structured by incorporating the intensity modulator section 12 and the color modulator section 14. However, this is not limitative, i.e. it can be structured as a projection display system 300 formed by a three-plated projection display 320 to modulate the intensity of light based on RGB three primary colors, a flood Fresnel lens 312 for receiving the projection light from the three-plated projection display 320, and an intensity-modulation panel 324 provided on the light-exit side of the Fresnel lens 312 and to modulate the intensity of light over the entire wavelength region, as shown in FIG. 26. In this case, the light modulator section for deciding a resolution of display may be any of a three-plated projection display 320 and an intensity modulator panel 324.

FIG. 26 is a schematic block diagram showing a hardware construction of a projection display system 300.

Figure 27:
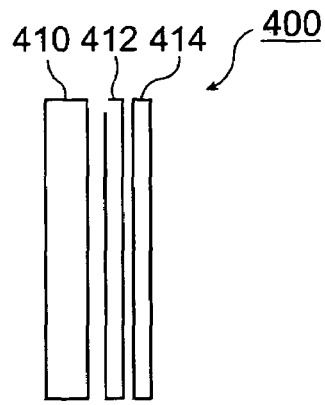
FIG. 27 is a schematic block diagram showing a hardware configuration of a display 400.

In the above exemplary embodiment, the projection display apparatus 100 was structured by incorporating the intensity modulator section 12 and the color modulator section 14. However, this is not limitative, i.e. it can be structured as a display 400 formed by a backlight 410, an intensity-modulation panel 412 provided on the light-exit side of the backlight 410 and for modulating the intensity of light over the entire wavelength region, a color-modulation panel 414 provided on the light-exit side of the intensity-modulation panel 412 and for modulating the intensity of light based on RGB three primary colors, as shown in FIG. 27. In this case, the light modulator section for deciding a resolution of display may be any of an intensity-modulation panel 412 and a color-modulation panel 414.

FIG. 27 is a schematic block diagram showing a hardware construction of a display 400.

In this manner, various exemplary variations can be considered as a structure of first light modulator element and second light modulator element. Including the structures of FIGS. 1, 21 and 27, the first and second light modulator elements have variations in structure that are summarized as follows. Incidentally, it is assumed that the second light modulator element is to decide a resolution of display and has a high resolution.

(1) A single-plated intensity-modulation light valve is used as a second light modulator element and a three-plated color-modulation light valve is as a first light modulator element, wherein the second light modulator element is provided close to the light source 10 (Structure of FIGS. 1, 22, 25 and 27). This can reduce manufacturing cost as compared to the structure (2).

(2) A single-plated intensity-modulation light valve is used as a first light modulator element and a three-plated color-modulation light valve is as a second light modulator element, wherein the first light modulator element is provided close to the light source 10 (Structure of FIGS. 1, 22, 25 and 27). This can enhance image quality as compared to the structure (1).

(3) A three-plated color-modulation light valve is used as a second light modulator element and a single-plated intensity-modulation light valve is as a first light modulator element, the second light modulator element being provided close to the light source 10 (Structure of FIGS. 23 and 26). This can enhance image quality as compared to the structure (4).

(4) A three-plated color-modulation light valve is used as a first light modulator element and a single-plated intensity-modulation light valve is as a second light modulator element, the first light modulator element being provided close to the light source 10 (Structure of FIGS. 23 and 26). This can reduce manufacturing cost as compared to the structure (3).

(5) A three-plated color-modulation light valve is used as a second light modulator element and a three-plated color-modulation light valve is as a first light modulator element, the second light modulator element being provided close to the light source 10 (Structure of FIG. 21). This can enhance image quality as compared to the structure (2) or (3).

(6) A three-plated color-modulation light valve is used as a first light modulator element and a three-plated color-modulation light valve is as a second light modulator element, the first light modulator element being provided close to the light source 10 (Structure of FIG. 21). This can enhance image quality as compared to the structure (2) or (3).

(7) A single-plated intensity-modulation light valve is used as a second light modulator element and a single-plated color-modulation light valve is as a first light modulator element, the second light modulator element being provided close to the light source 10 (Structure of FIG. 24). This can reduce manufacturing cost as compared to the structure (8).

(8) A single-plated intensity-modulation light valve is used as a first light modulator element and a single-plated color-modulation light valve is as a second light modulator element, the first light modulator element being provided close to the light source 10 (Structure of FIG. 24). This can enhance image quality as compared to the structure (7).

(9) A single-plated color-modulation light valve is used as a second light modulator element and a single-plated intensity-modulation light valve is as a first light modulator element, the second light modulator element being provided close to the light source 10. This can enhance image quality as compared to the structure (10).

(10) A single-plated color-modulation light valve is used as a first light modulator element and a single-plated intensity-modulation light valve is as a second light modulator element, the first light modulator element being provided close to the light source 10. This can reduce manufacturing cost as compared to the structure (9).

(11) A single-plated color-modulation light valve is used as a second light modulator element and a three-plated color-modulation light valve is as a first light modulator element, the second light modulator element being provided close to the light source 10. This can reduce manufacturing cost as compared to the structure (12).

(12) A single-plated color-modulation light valve is used as a first light modulator element and a three-plated color-modulation light valve is as a second light modulator element, the first light modulator element being provided close to the light source 10. This can enhance image quality as compared to the structure (11).

(13) A three-plated color-modulation light valve is used as a second light modulator element and a single-plated color-modulation light valve is as a first light modulator element, the second light modulator element being provided close to the light source 10. This can enhance image quality as compared to the structure (14).

(14) A three-plated color-modulation light valve is used as a first light modulator element and a single-plated color-modulation light valve is as a second light modulator element, the first light modulator element being provided close to the light source 10. This can reduce manufacturing cost as compared to the structure (13).

(15) A single-plated color-modulation light valve is used as a second light modulator element and a single-plated color-modulation light valve is as a first light modulator element, the second light modulator element being provided close to the light source 10. This can enhance image quality as compared to the structure (9).

(16) A single-plated color-modulation light valve is used as a first light modulator element and a single-plated color-modulation light valve is as a second light modulator element, the first light modulator element being provided close to the light source 10. This can enhance image quality as compared to the structure (9).

(17) A single-plated intensity-modulation light valve is used as a second light modulator element and a single-plated intensity-modulation light valve is as a first light modulator element, the second light modulator element being provided close to the light source 10. This can reduce manufacturing cost as compared to the structure (10).

(18) A single-plated intensity-modulation light valve is used as a first light modulator element and a single-plated intensity-modulation light valve is as a second light modulator element, the first light modulator element being provided close to the light source 10. This can reduce manufacturing cost as compared to the structure (10).

In the above exemplary embodiment, control values were decided for the intensity-modulation and color-modulation light valves depending upon HDR display data. However, where utilizing the usual RGB image data at 8 bits per color, the value 0-255 of the usual RGB image data is not an intensity physical quantity but a relative value of 0-255. Consequently, in order for the display apparatus of exemplary embodiments of the invention to make a display depending upon the usual RGB image data, there is a need to decide a physical intensity level Rp for display or a transmissivity Tp of the display overall, from the usual RGB image.

Figure 28:
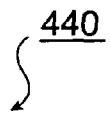
FIG. 28 is a figure showing a data structure of an input-value library table 440.

FIG. 28 is a figure showing a data structure of an input-value library table 440.

For the purpose, the use of the input-value library table 440 of FIG. 28 enables conversion of an input value 0-255 of the usual RGB image into a physical transmissivity Tp. Furthermore, by the setting manner of transmissivity Tp in the table, display appearance (intensity level characteristic) can be easily changed for the usual RGB image. The transmissivity Tp in the table is Tp of the foregoing equation (2). After this value is decided, the similar processing to the above exemplary embodiment decides the transmissivities T1, T2 of a plurality of light modulator elements thus enabling display.

Figure 29:
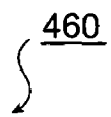
FIG. 29 is a figure showing a data structure of an input-value library table 460.

FIG. 29 is a figure showing a data structure of the input-value library table 460.

The input-value library table 460 of FIG. 29 uses intensity level Rp in place of transmissivity Tp. The intensity level Rp of this table is the Rp of the foregoing equation (1). Accordingly, after this value is decided, the similar processing to the above exemplary embodiment decides the transmissivities T1, T2 of a plurality of light modulator elements thus enabling display.

In the above exemplary embodiment, for each pixel of the color-modulation light valve, calculated was a weighted mean value of the transmissivities T1 decided on the pixel of intensity-modulation light valve overlapping, on the optical path, with that pixel so that a transmissivity T2 of that pixel can be calculated on the basis of the mean value. However, this is not limitative, i.e. for each pixel of the color-modulation light valve, on the basis of a control value decided on a pixel of intensity-color light valve overlapping, on the optical axis, with that pixel, a transmissivity T1$_{table}$ corresponding to the control value can be read out of the control-value library table 400 whereby a weighted mean value of the read-out transmissivities T1$_{table}$ is calculated, based on which mean value a transmissivity T2 at the pixel is calculated.

In the exemplary above embodiment, calculated was a mean value, etc. of the transmissivities T1' calculated based on RGB three primary colors, as T1' of that pixel. However, this is not limitative, the transmissivity T1' can be calculated based on RGB three colors so that, at step S14, a mean value, etc. of the transmissivities T1 calculated based on RGB three primary colors on the same pixel can be calculated as T1 of that pixel.

In the above exemplary embodiment, for each pixel of the color-modulation light valve, calculated was a weighted mean value of the transmissivities T1 decided on the pixel of intensity-modulation light valve overlapping, on the optical path, with that pixel, to calculate a transmissivity T2 of that pixel depending upon the mean value. However, this is not limitative, i.e. for each pixel of the color-modulation light valve, calculated can be a maximum value, a minimum value or a mean value of the transmissivities T1 determined on the pixel of the intensity-modulation light valve overlapping, on the optical path, with that pixel, to calculate a transmissivity T2 of that pixel depending upon the calculated values.

In the above exemplary embodiment, the intensity of light was modulated at two stages by use of the intensity-modulation and color-modulation light valves. However, this is not limitative, i.e. the intensity of light can be modulated at two stages by use of two sets of intensity-modulation light valves.

In the above exemplary embodiment, the liquid-crystal light valves 30, 40R-40B were structured by active-matrix liquid-crystal displays. However, this is not limitative, i.e. the liquid-crystal light valves 30, 40R-40B can be structured by using passive-matrix liquid-crystal displays and segment liq-uid-crystal displays. The active-matrix liquid-crystal display has a merit that accurate intensity display is possible while the passive-matrix liquid-crystal display and segment liquid-crystal display have an advantage that manufacturing is possible at low cost.

In the above exemplary embodiment, the projection display apparatus 100 was structured by providing a transmission light modulator element. However, this is not limitative, i.e. the intensity-modulation light valve or the color-modulation light valve can be structured by a reflective light modulator element of DMD (digital micromirror device) or the like. In this case, reflectivity is decided depending upon HDR display data.

In the above exemplary embodiment, used was the light modulator element small in pixel count and intensity levels in order to simplify explanation. However, where using a light modulator element great in pixel count and intensity levels, processing is possible similarly to the above exemplary embodiment.

In the above exemplary embodiment, setting was with gain G=1.0 in order to simplify explanation. However, gain G=1.0 is not applicable for certain hardware configurations. Meanwhile, when considering actual calculation cost, the control-value library table is preferably registered with control values and transmissivities in the form including the effect of gain G.

In the above exemplary embodiment, explanation was made on the case to execute the control program previously stored in the ROM 72 upon executing the process shown in the flowchart of FIG. 5. However, this is not limitative, i.e. out of the storage medium storing a program showing those procedures, the program may be executed by being read out to the RAM 74.

Here, storage medium is a semiconductor storage medium such as a RAM or ROM, a magnetic storage medium such as an FD or an HD, an optical-reading-schemed storage medium such as a CD, a CDV, an LD or a DVD or magnetic-storing-type/optical-reading-schemed storage medium such as an MD, including any of storage mediums provided that it can be read by a computer regardless of the reading method of electronic, magnetic, optical or the like.

The above exemplary embodiment applied the light propagation characteristic control apparatus, optical display, light propagation characteristic control program, optical display control program, light propagation characteristic control method and optical display control method of exemplary embodiments of the invention to the projection display apparatus 100, as shown in FIG. 1. However, this is not limitative, i.e. application is possible to other cases within the scope not departing from the gist of exemplary embodiments of the present invention.

What is claimed is:

1. An optical display apparatus, comprising:
   a light source,
   a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image;
   a light propagation characteristic tentative deciding device to tentatively decide a light propagation characteristic of each pixel of the second light modulator element depending upon display data;
   a first light propagation characteristic deciding device to decide a light propagation characteristic of each pixel of the first light modulator element depending upon the light propagation characteristic tentatively decided by the light propagation characteristic tentative deciding device and the display data;

a first control value deciding device to decide a control value of each pixel of the first light modulator element depending upon the light propagation characteristic decided by the first light propagation characteristic deciding device;

a second light propagation characteristic deciding device to decide a light propagation characteristic of each pixel of the second light modulator element depending upon the light propagation characteristic decided by the first light propagation characteristic deciding device and the display data; and a second control value deciding device to decide a control value of each pixel of the second light modulator element depending upon the light propagation characteristic decided by the second light propagation characteristic deciding device;

the light propagation characteristic tentative deciding device being allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient, wherein the light propagation characteristic tentative deciding device calculates the intensity level n with use of the gamma characteristic expression $Rp = Rmax \times (n/m)^\gamma$, Rp being an intensity level of a pixel p in the display data, Rmax being a maximum value of intensity level in the display data, n being an intensity level of a pixel of the second light modulator element corresponding to the pixel p, m being a coefficient in accordance with the number of levels of the second light modulator element, and γ being a gamma coefficient.

and tentatively decides a light propagation characteristic of the pixel of the second light modulator element corresponding to the pixel p based on the calculated intensity level n.

2. The optical display apparatus according to claim 1, the coefficient m being set at a value obtained by multiplying a multiplier greater than 1 to the number of levels of the second light modulator element.

3. The optical display apparatus according to claim 1, the gamma coefficient γ being set at 4 or greater.

4. The optical display apparatus according to claim 1, the gamma coefficient γ being set at 0 or greater and ¼ or smaller.

5. The optical display apparatus according to claim 1, the second light modulator element being a light modulator element decisive of a resolution of display.

6. The optical display apparatus according to claim 1, one of the first and second light modulator elements being a particular-wavelength-regioned intensity modulator element to modulate an intensity of light in a particular wavelength region for a plurality of different particular wavelength regions of a wavelength region of light, the other of the first and second light modulator elements being an entire-wavelength-regioned modulator element to modulate an intensity of light over the entire wavelength region.

7. The optical display apparatus according to claim 1, the first and second light modulator elements being particular-wavelength-regioned intensity modulator elements to modulate an intensity of light in a particular wavelength region for a plurality of different particular wavelength regions of a wavelength region of light.

8. The optical display apparatus according to claim 1, the second light modulator element having a higher resolution than the first light modulator element.

9. The optical display apparatus according to claim 1, wherein the first light modulator and the second light modulator are LCD panels.

10. A computer readable storage medium storing a light display apparatus control program for use with a computer that controls an optical display apparatus having a light source, a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image, wherein at least the first light modulator element or the second light modulator element is capable of producing colors across the full color spectrum, the program comprising:

a light propagation characteristic tentative deciding program for tentatively deciding a light propagation characteristic of each pixel of the second light modulator element depending upon display data;

a first light propagation characteristic deciding program for deciding a light propagation characteristic of each pixel of the first light modulator element depending upon the light propagation characteristic tentatively decided by the light propagation characteristic tentative deciding program and the display data;

a first control value deciding program for deciding a control value of each pixel of the first light modulator element depending upon the light propagation characteristic decided by the first light propagation characteristic deciding program;

a second light propagation characteristic deciding program for deciding a light propagation characteristic of each pixel of the second light modulator element depending upon the light propagation characteristic decided by the first light propagation characteristic deciding program and the display data; and a second control value deciding program for deciding a control value of each pixel of the second light modulator element depending upon the light propagation characteristic decided by the second light propagation characteristic deciding program;

the light propagation characteristic tentative deciding program being allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficient, wherein the light propagation characteristic tentative deciding program calculates the intensity level n with use of the gamma characteristic expression $Rp = Rmax \times (n/m)^\gamma$, Rp being an intensity level of a pixel p in the display data, Rmax being a maximum value of intensity level in the display data, n being an intensity level of a pixel of the second light modulator element corresponding to the pixel p, m being a coefficient in accordance with the number of levels of the second light modulator element, and γ being a gamma coefficient, and tentatively decides a light propagation characteristic of the pixel of the second light modulator element corresponding to the pixel p based on the calculated intensity level n.

11. The light display apparatus control program according to claim 10, wherein the first light modulator and the second light modulator are LCD panels.

12. An optical display apparatus control method to control an optical display apparatus having a light source, a first light modulator element having a plurality of pixels capable of independently controlling light propagation characteristics and a second light modulator element having a plurality of pixels capable of independently controlling light propagation characteristics, to thereby modulate light from the light source through the first and second light modulator elements and display an image, wherein at least the first light modulator element or the second light modulator element is capable of producing colors across the full color spectrum, the method comprising:

tentatively deciding a light propagation characteristic of each pixel of the second light modulator element depending upon display data;

deciding a light propagation characteristic of each pixel of the first light modulator element depending upon the light propagation characteristic tentatively decided by the light propagation characteristic tentative deciding and the display data;

deciding a control value of each pixel of the first light modulator element depending upon the light propagation characteristic decided by the first light propagation characteristic deciding;

deciding a light propagation characteristic of each pixel of the second light modulator element depending upon the light propagation characteristic decided by the first light propagation characteristic deciding and the display data; and deciding a control value of each pixel of the second light modulator element depending upon the light propagation characteristic decided by the second light propagation characteristic deciding;

the light propagation characteristic tentative deciding being allowed to tentatively decide a light propagation characteristic of each pixel of the second light modulator element by use of a gamma characteristic expression to calculate an intensity level of light to be modulated through the first and second light modulator elements depending upon an intensity level of light to be modulated through the second light modulator element and a gamma coefficients, wherein the light propagation characteristic tentative deciding calculates the intensity level n with use of the gamma characteristic expression $Rp = Rmax \times (n/m)^\gamma$, Rp being an intensity level of a pixel p in the display data. Rmax being a maximum value of intensity level in the display data, n being an intensity level of a pixel of the second light modulator element corresponding to the pixel p. m being a coefficient in accordance with the number of levels of the second light modulator element, and γ being a gamma coefficient, and tentatively decides a light propagation characteristic of the pixel of the second light modulator element corresponding to the pixel p based on the calculated intensity level n.

13. The optical display apparatus control method according to claim 12, wherein the first light modulator and the second light modulator are LCD panels.

* * * * *

UNITED STATES PATENT AND TRADEMARK OFFICE
CERTIFICATE OF CORRECTION

PATENT NO. : 7,663,705 B2  Page 1 of 1
APPLICATION NO. : 11/013336
DATED : February 16, 2010
INVENTOR(S) : Asahi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this

Twenty-eighth Day of December, 2010

David J. Kappos
*Director of the United States Patent and Trademark Office*